United States Patent
Zhang et al.

(10) Patent No.: US 10,972,238 B2
(45) Date of Patent: Apr. 6, 2021

(54) SYSTEM AND METHOD FOR PHASE TRACKING REFERENCE SIGNAL (PT-RS) MULTIPLEXING

(71) Applicant: APPLE INC., Cupertino, CA (US)

(72) Inventors: Yushu Zhang, Beijing (CN); Alexei Davydov, Nizhny Novgorod (RU); Gang Xiong, Portland, OR (US); Wook Bong Lee, Pleasanton, CA (US); Guotong Wang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/465,994

(22) PCT Filed: Jun. 11, 2018

(86) PCT No.: PCT/US2018/036959
§ 371 (c)(1),
(2) Date: May 31, 2019

(87) PCT Pub. No.: WO2018/227209
PCT Pub. Date: Dec. 13, 2018

(65) Prior Publication Data
US 2019/0296877 A1    Sep. 26, 2019

Related U.S. Application Data

(60) Provisional application No. 62/520,844, filed on Jun. 16, 2017.

(30) Foreign Application Priority Data

Jun. 9, 2017   (WO) ............... PCT/CN2017/087710

(51) Int. Cl.
*H04L 5/00*    (2006.01)
*H04L 1/00*    (2006.01)
*H04W 72/04*   (2009.01)

(52) U.S. Cl.
CPC .......... *H04L 5/0048* (2013.01); *H04L 1/0009* (2013.01); *H04W 72/042* (2013.01);
(Continued)

(58) Field of Classification Search
CPC ..... H04L 5/0048; H04L 5/005; H04L 5/0051; H04L 5/0053; H04L 1/0009; H04W 72/042; H04W 72/0446
See application file for complete search history.

(56) References Cited

U.S. PATENT DOCUMENTS 10,608,799 B2 *   3/2020   Nam ..................... H04L 5/0051
2016/0105264 A1   4/2016   Chen et al.
(Continued)

OTHER PUBLICATIONS

R1-1703879: 3GPP TSG RAN WG1 Mtg #88; WF on PTRS; NTT DOCOMO, Huawei, HiSilicon, Panasonic, Ericsson, Intel, CATT, Nokia, ASB; Agenda Item: 8.1.2.4.3; Athens Greece; Feb. 13-17, 2017.
(Continued)

*Primary Examiner* — Brenda H Pham

(57) ABSTRACT

Technology for a next generation node B (gNB), operable to use phase tracking reference signals (PT-RS) is disclosed. The gNB can identify a modulation and coding 5 scheme (MCS) for the UE for a bandwidth part (BWP) with a subcarrier spacing (SCS). The gNB can select a time density of the PT-RS based on the MCS. The gNB can select a frequency density of the PT-RS based on an allocated bandwidth in the BWP. The gNB can encode the time density and the frequency density, for the PT-RS for transmission to the UE in higher layer signaling.

12 Claims, 20 Drawing Sheets

(52) U.S. Cl.
CPC ....... *H04W 72/0446* (2013.01); *H04L 5/0007* (2013.01); *H04L 5/0053* (2013.01)

(56) References Cited

U.S. PATENT DOCUMENTS

2020/0127776 A1* 4/2020 Maki ..................... H04L 27/364
2020/0196332 A1* 6/2020 Yokomakura ..... H04W 72/0453

OTHER PUBLICATIONS

R1-1703221: 3GPP TSG RAN WG1 Mtg #88; On PTRS performance; Ericsson; Agenda Item: 8.1.2.4.3; Athens Greece; Feb. 13-17, 2017.

* cited by examiner

| MCS | BW | SCS | Dynamic presence of PT-RS | Time density of PT-RS | Frequency density of PT-RS |
|---|---|---|---|---|---|
| X0 | Y0 | Z0 | No | - | - |
| X1 | Y1 | Z1 | Yes | Every symbol | 0.5 RE/symbol |
| X2 | Y2 | Z2 | Yes | Every other symbol | 1 RE/symbol |

FIG. 12

SYSTEM AND METHOD FOR PHASE TRACKING REFERENCE SIGNAL (PT-RS) MULTIPLEXING

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 12 illustrates an exemplary table illustrating an example of a PT-RS configuration, in accordance with an example;

Figure 1:
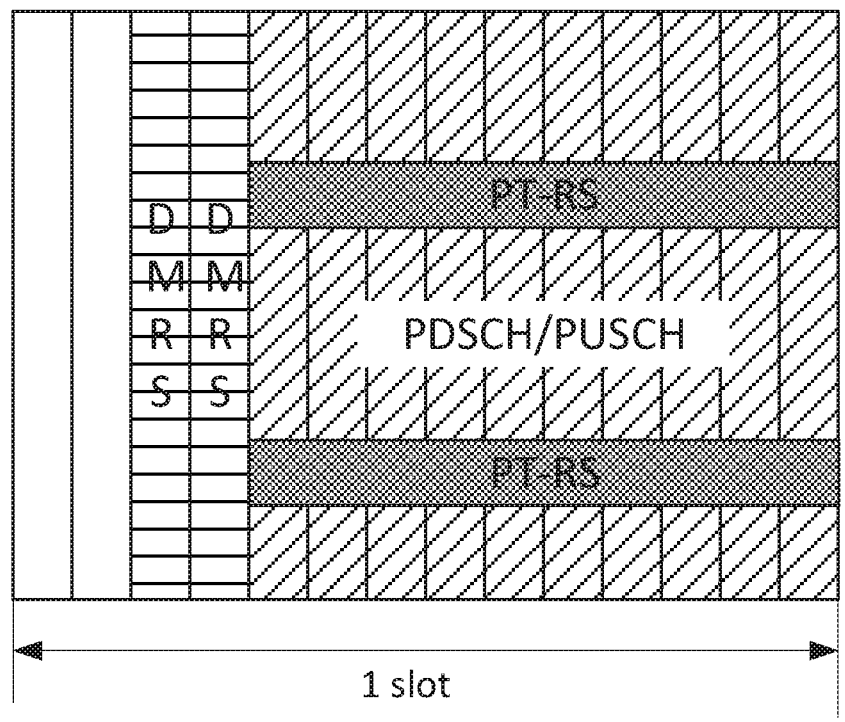
FIG. 1 illustrates an example for phase tracking reference signal (PT-RS) mapping, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. Mechanisms are disclosed for configuration of downlink (DL) control channel monitoring occasions. Additionally, different options for defining UE behavior and handling of multiple DL control channel monitoring configurations from a single UE perspective are disclosed. The next generation wireless communication system, 5G or new radio (NR) will provide access to information and sharing of data anywhere, at any time by various users and applications. NR is expected to be a unified network/system that is targeted to meet vastly different and sometime conflicting performance dimensions and services.

For a system operating in a high frequency band, e.g. >6 GHz, to compensate the phase offset resulting from phase noise and frequency offset, a Phase Tracking Reference Signal (PT-RS) can be used for the symbols that are not using a Demodulation Reference Signal (DM-RS).

FIG. 1 illustrates an example for phase tracking reference signal (PT-RS) mapping. Dynamic presence and time/frequency densities of the PT-RS transmission can be determined by a Modulation and Coding Scheme (MCS), a Subcarrier Spacing (SCS) and an allocated bandwidth (BW) for a physical downlink shared channel (PDSCH) or physical uplink shared channel (PUSCH) allocation in a bandwidth part (BWP). However for different bandwidth parts (BWPs), the SCS may be different. If a UE is allocated with multiple bandwidth parts, determining the dynamic presence and time/frequency density of PT-RS is considered. In one embodiment, a PT-RS can be included in one or more reference elements (REs) in each symbol of a slot of the PDSCH/PUSCH that does not include a DMRS. In addition to the DMRS, there can be an offset of symbols at the beginning of an allocation that do not include the PT-RS.

Figure 2:
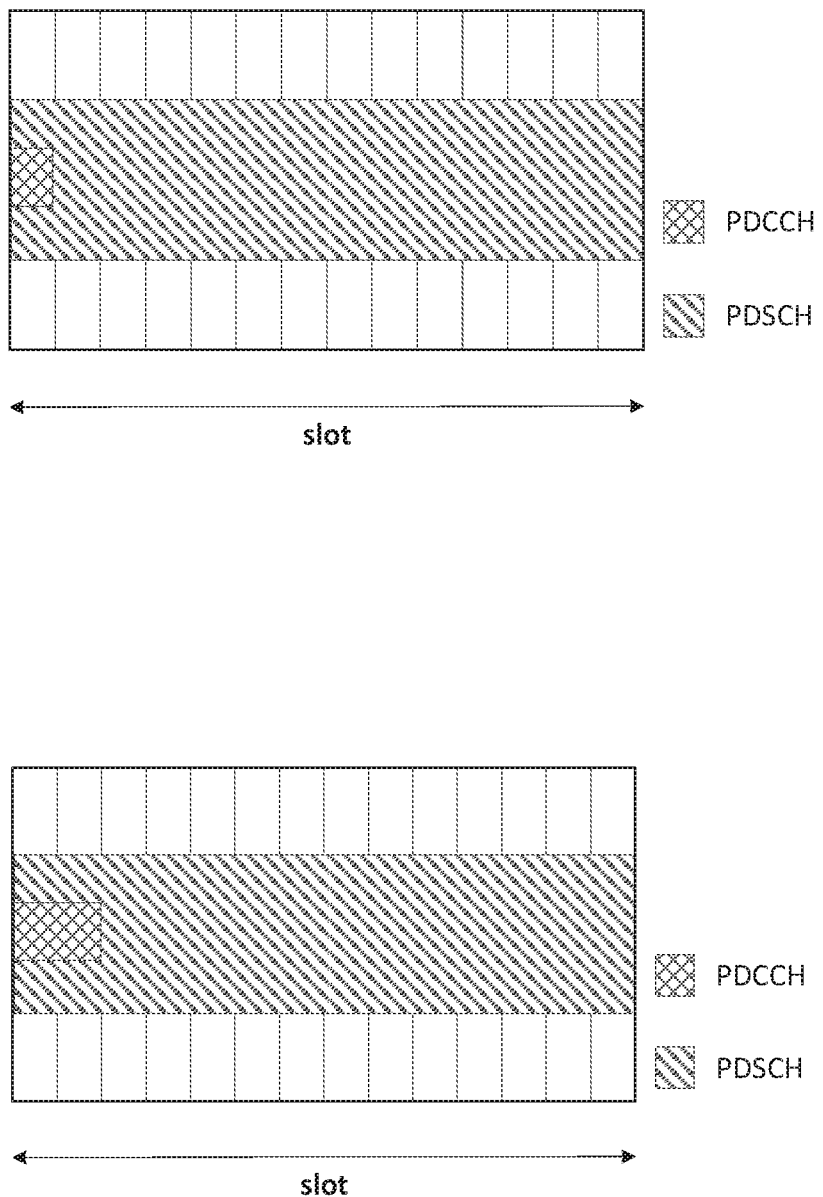
FIG. 2 illustrates an example for PT-RS multiplexing in downlink (DL), in accordance with an example.
Figure 3:
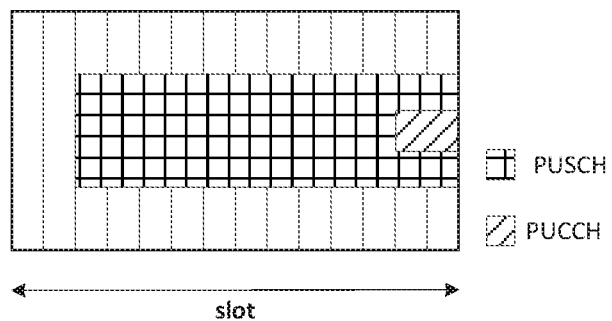
FIG. 3 illustrates an example for PT-RS multiplexing in uplink (UL), in accordance with an example.

Further, the symbol index of a front-loaded DM-RS for DL data transmission, can be fixed. For dynamic resource sharing of control and data, the associated downlink (DL) or uplink (UL) data can be multiplexed with a DL or an UL control channel in a frequency division multiplexing (FDM) manner. Accordingly, FIG. 2 and FIG. 3 illustrate that a data channel may be transmitted starting from the first symbol within one slot, before the DMRS transmission in a downlink slot. In the example of FIG. 2, a PDCCH can be included in the first and/or first and second symbols of a downlink slot. In the example of FIG. 3, a PUCCH can be included in the last two symbols of an uplink slot. Accordingly, solutions for PT-RS dynamic presence and time/frequency densities design for multiple bandwidth part allocation are disclosed. Additionally, solutions for PT-RS resource mapping when a physical downlink shared channel (PDSCH) shares the resource with a physical downlink control channel (PDCCH), and when a physical uplink shared channel (PUSCH) shares the resource with physical uplink control channel (PUCCH), are also disclosed.

PT-RS for Multiple Bandwidth Parts

If a UE is scheduled with multiple bandwidth parts (BWPs), it is possible that different subcarrier spacing (SCS) may be used in different bandwidth parts. The SCS, the MCS and the allocated BW could have some impact on the dynamic presence and time/frequency densities of PT-RS. Hence, when a UE is allocated with multiple bandwidth parts, determining the dynamic presence and density of PT-RS can be considered.

Figure 4:
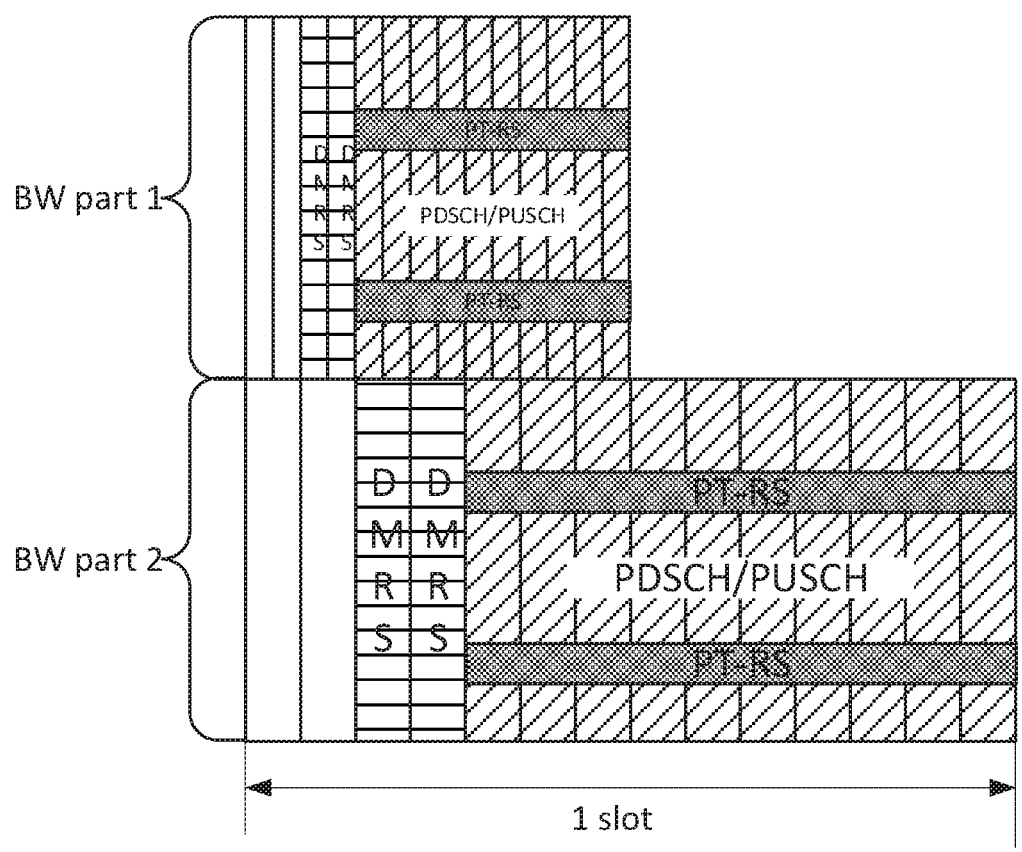
FIG. 4 illustrates an example for a user equipment (UE) with multiple bandwidth parts (BWPs) with different subcarrier spacing (SCS), in accordance with an example.

FIG. 4 illustrates an example for a user equipment (UE) with multiple bandwidth parts (BWPs) with different subcarrier spacing (SCS). In an embodiment, a dynamic presence, a time density and a frequency density of PT-RS in each bandwidth part can be independently determined by the allocated bandwidth (BW) and SCS in the bandwidth part, as well as the MCS used in the bandwidth part, if a UE is scheduled with multiple bandwidth parts.

In one example, if the UE is allocated two bandwidth parts, SCS k1 is used for bandwidth part 1, and SCS k2 is used for bandwidth part 2, where the range of k1 and k2 can be included but not limited to the range of 15 kilohertz (kHz), 30 kHz, 60 kHz, or 120 kHz. Additionally, the PT-RS pattern can be independently determined by each bandwidth when k1≠k2. On the other hand, if k1=k2, the PT-RS pattern can be jointly determined by the allocated bandwidth in both bandwidth parts or determined by the allocated bandwidth in each bandwidth part independently.

Figure 5:
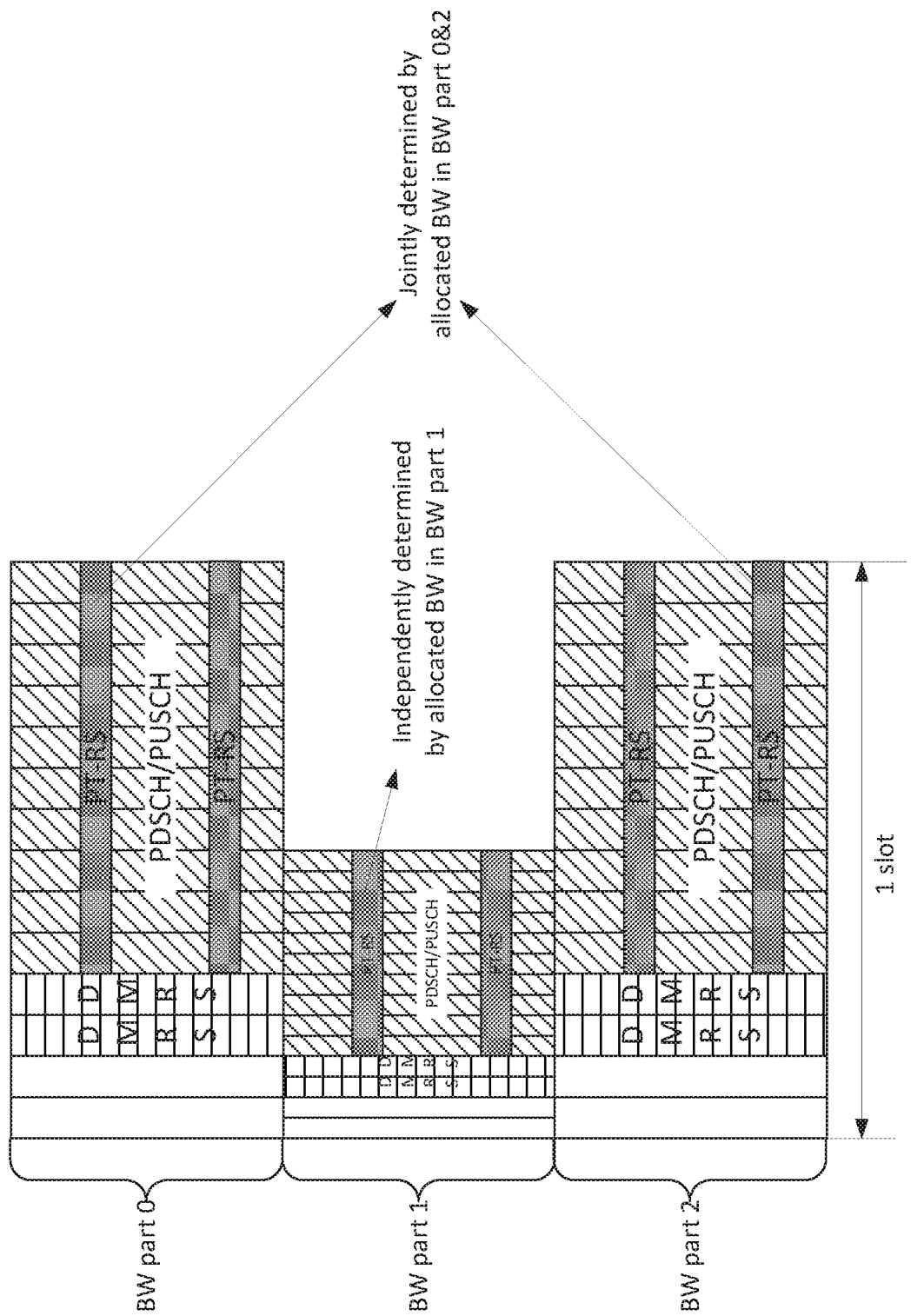
FIG. 5 illustrates an example for phase tracking reference signal (PT-RS) for multiple BWPs, in accordance with an example.

Further, in another embodiment, if a UE is allocated, based an integer N, the UE can be configured with N>2 bandwidth parts. In some instances, some BWPs can utilize different SCS. In one option, dynamic presence and density of a PT-RS for each bandwidth part can be determined by an SCS, an MCS and an allocated BW for each bandwidth part independently. In another option, it can be determined jointly for some variations of BW with the same SCS. FIG. 5 illustrates one example for the PT-RS transmission for multiple bandwidth parts.

PT-RS Sharing Symbols with Other Signals

The data channel may be multiplexed with a PDCCH or a PUCCH, a Channel State Information Reference Signal (CSI-RS), and a Sounding Reference Signal (SRS) or a Synchronization Signal (SS) block. Accordingly, some subcarriers in one symbol may be used by other signals. The use of other subcarriers can be taken into account in order to determine the dynamic presence and time/frequency densities for PT-RS.

In an embodiment, the PT-RS can be transmitted starting from the first data symbol regardless of whether or not the PDCCH is transmitted. In another option, PT-RS can be transmitted at the first symbol(s) where there is not a PDCCH. Further the PT-RS may not be transmitted at the symbol where there is a PUCCH or a CSI-RS or an SS block. In these instances, the PT-RS may be punctured to include the PDCCH, PUCCH, CSI-RS, or SS block.

In an alternative, PT-RS can be transmitted at the symbol where there is a PDCCH, a PUCCH, a CSI-RS or an SS block. The frequency domain density for each symbol may be determined independently, given the scheduled BW is $N_{RB}$, and the other signal transmitted in the same symbol uses $K_0$ subcarriers. The bandwidth that is used to determine the dynamic presence and the frequency density for this symbol is calculated by $$\frac{N_{RB}N_{RB}^{SC} - K_0}{N_{RB}^{SC}},$$

where $N_{RB}^{SC}$ refers to the number of subcarriers per Resource Block (RB) and $K_0$ is the number of subcarriers for other signals in the same symbol. Further, a threshold, X, can be determined or defined, where a relative amount of remaining bandwidth is less than X, then the PT-RS is not transmitted. X can be a number between 0 and 1.

Figure 6:
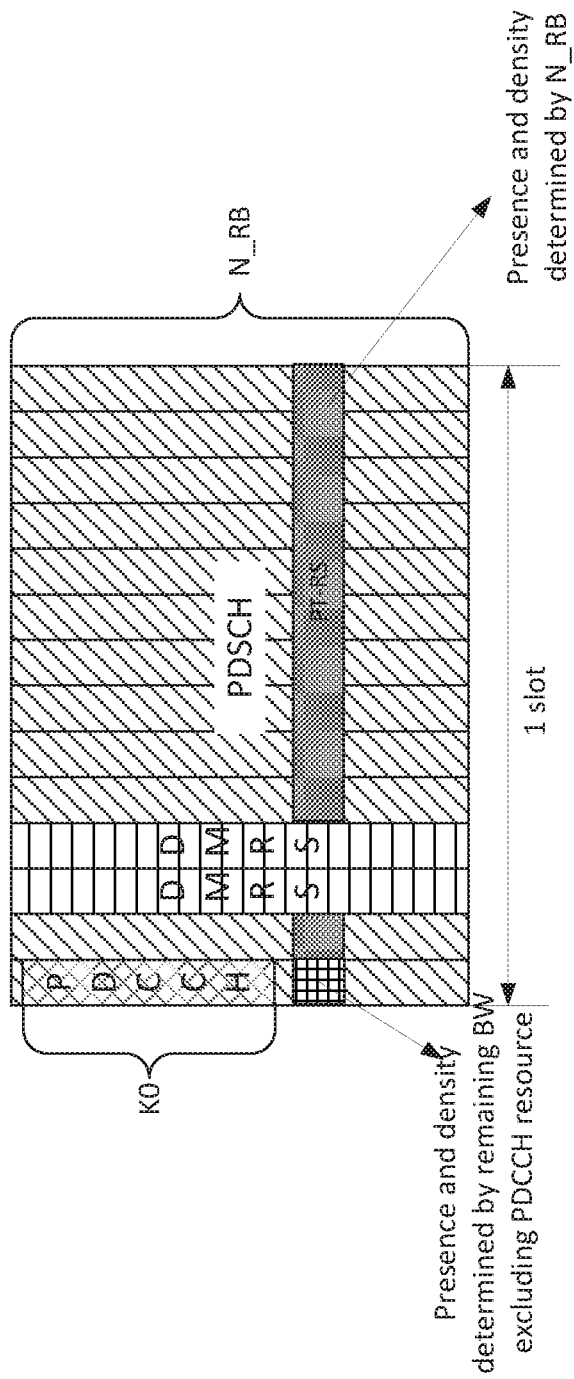
FIG. 6 illustrates an example for the PT-RS transmission when multiplexing with other signals with the same SCS, in accordance with an example.

FIG. 6 illustrates an example for the PT-RS transmission when multiplexing with other signals with the same SCS. In one embodiment, for dynamic sharing of a DL or an UL control and data in the same symbols within one slot, the starting position of a DL data transmission can be dynamically indicated and explicitly indicated in a UE specific downlink control information (DCI) or a group common PDCCH or group common DCI.

In one embodiment, for a case where the DCI signals a DL data starting symbol equal to or less than a control resource set (CORESET) duration in the time domain, the DL data channel can either be rate matched around the control resource set for DL control channel or around the resources actually used for transmission of the DL control channel.

In this case, the starting position of a PT-RS may be aligned with the transmission of a DL data channel. Within the frequency resource, where the DL data channel is rate matched around the control resource set or the resources actually used for the transmission of the DL control channel, the starting position of the PT-RS can be aligned with that of the DL data transmission.

Figure 7:
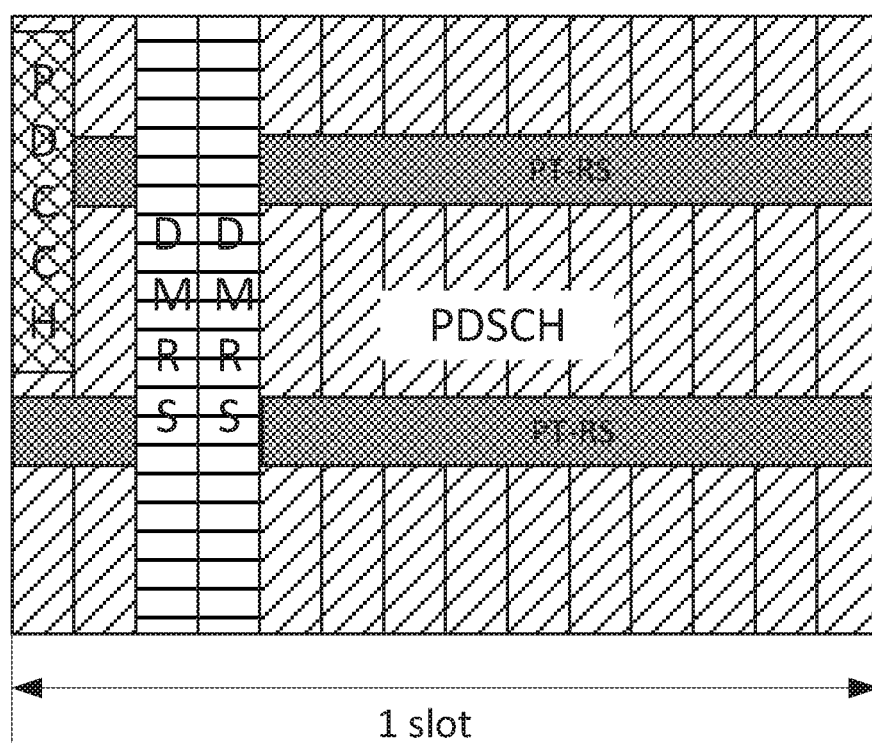
FIG. 7 illustrates an example of PT-RS pattern for dynamic resource sharing of DL control and data channel, in accordance with an example.

FIG. 7 illustrates an example of PT-RS pattern for dynamic resource sharing of DL control and data channel. In one example, a PT-RS starting position is aligned with a DL data transmission. In particular, a PT-RS can start from the first symbol in the frequency resource where the DL data channel does not overlap with the DL control channel in the first symbol. Further, the PT-RS can start from the second symbol in the frequency resource where the DL data channel is rate matched around the PDCCH.

As an alternative, the starting position of the PT-RS is the same, relative to the starting position of the DL data channel signaled in the UE specific DCI in the case of the dynamic resource sharing of the DL control and DL data channel. In particular, it can be the same as the starting position of the DL data channel signaled in the UE specific DCI, the first symbol after the control resource set (CORESET), or the resource used for the transmission of the DCI. In the former case, the PT-RS may puncture the PDCCH in the first few symbols.

Figure 8:
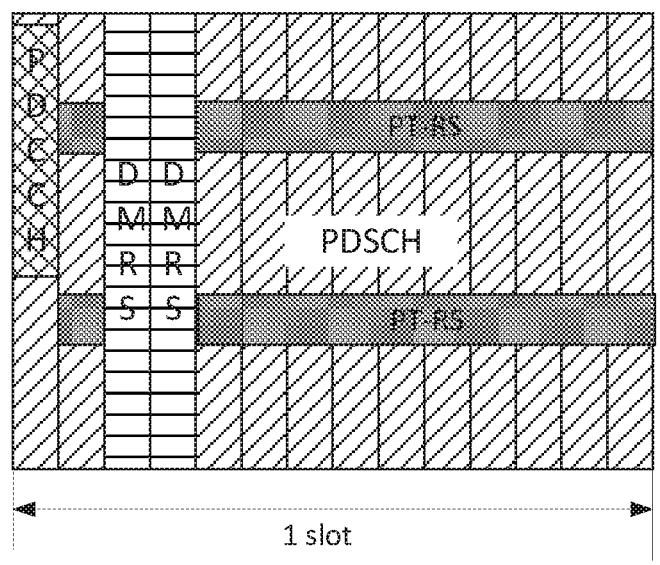
FIG. 8 illustrates another example of PT-RS pattern for dynamic resource sharing of DL control and data channel, in accordance with an example.

FIG. 8 illustrates another example of a PT-RS pattern for dynamic resource sharing of DL control and data channel. In the example displayed by FIG. 8, the PT-RS starting position is the second symbol in the slot, which is the first symbol after the PDCCH.

In one embodiment, in the case when the physical uplink share channel (PUSCH) and the physical uplink control channel (PUCCH) are multiplexed in a frequency division multiplexing (FDM) manner in the last symbol(s) within a slot from the same or different UEs, as previously illustrated in FIG. 3, the PT-RS end position can be aligned with the PUSCH end position.

Figure 9:
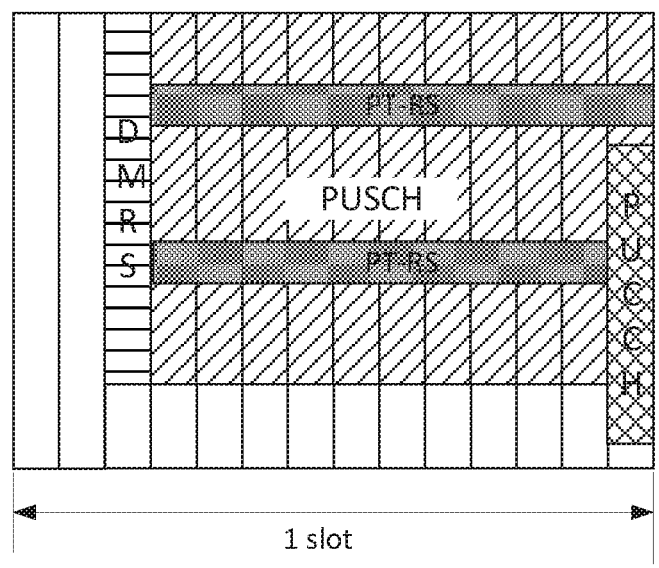
FIG. 9 illustrates an example of PT-RS end position when physical uplink shared channel (PUSCH) and physical channel uplink control channel are multiplexed in a frequency division multiplexing manner in the last symbol(s), in accordance with an example.

FIG. 9 illustrates an example of a PT-RS end position when physical uplink shared channel (PUSCH) and physical uplink control channel (PUCCH) are multiplexed in a frequency division multiplexing manner in the last symbol(s). In one example, where the frequency resource of the PUSCH and the PUCCH overlap, the PT-RS end position is located in the second to last symbol. Further, in the frequency resource where the PUSCH and the PUCCH do not overlap, the PT-RS end position is located in the last symbol within a slot.

As an alternative, the end position of the PT-RS can be the same symbol within a slot, relative to the end position of the PUSCH in the case when the PUSCH and the PUCCH are multiplexed in an FDM manner in the last symbol(s). In particular, it can be the same symbol as the end position of the PUSCH signaled in the UE specific DCI or the first symbol before the PUCCH transmission.

Figure 10:
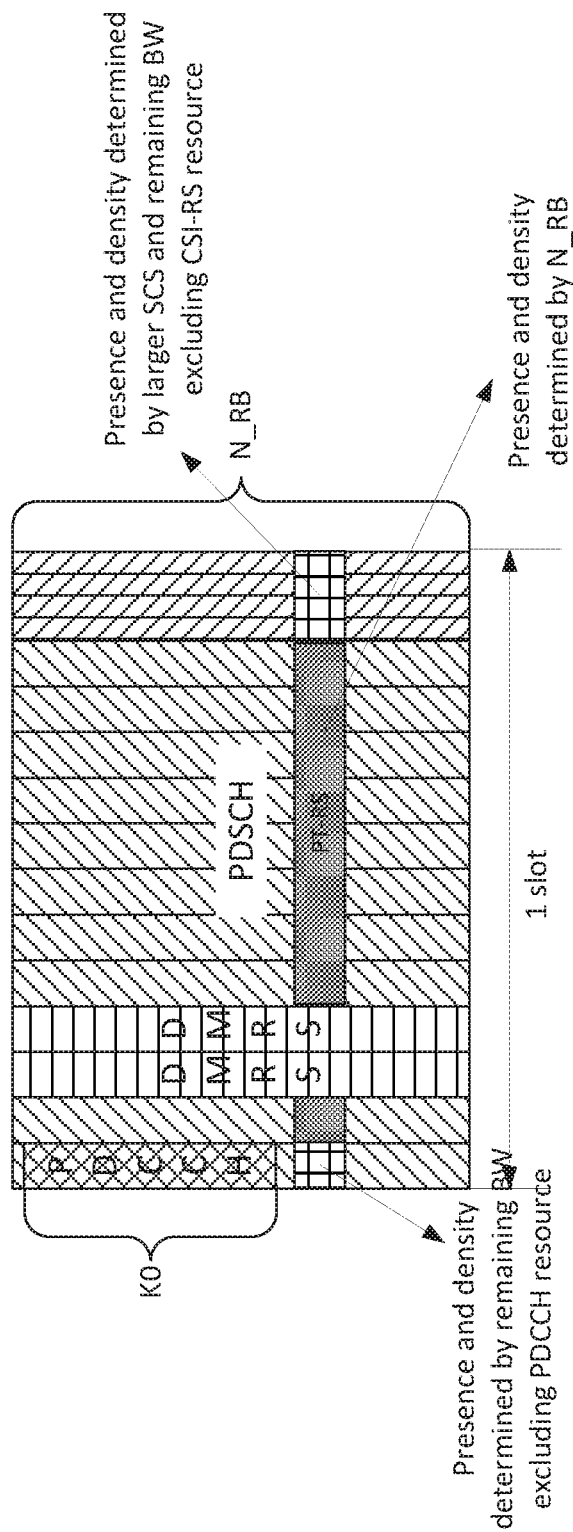
FIG. 10 illustrates an example for the PT-RS transmission when multiplexing with other signals with different SCS, in accordance with an example.

FIG. 10 illustrates an example for the PT-RS transmission when multiplexing with other signals with different SCS. In one embodiment, the larger SCS may be used for the CSI-RS or the sounding reference signal (SRS) for beam management, where the data may also be multiplexed to the remaining subcarriers at the CSI-RS or SRS symbol. Additionally, the presence and time/frequency density for the PT-RS in that symbol can be independently determined by the SCS, the BW and the MCS in that symbol.

Figure 11:
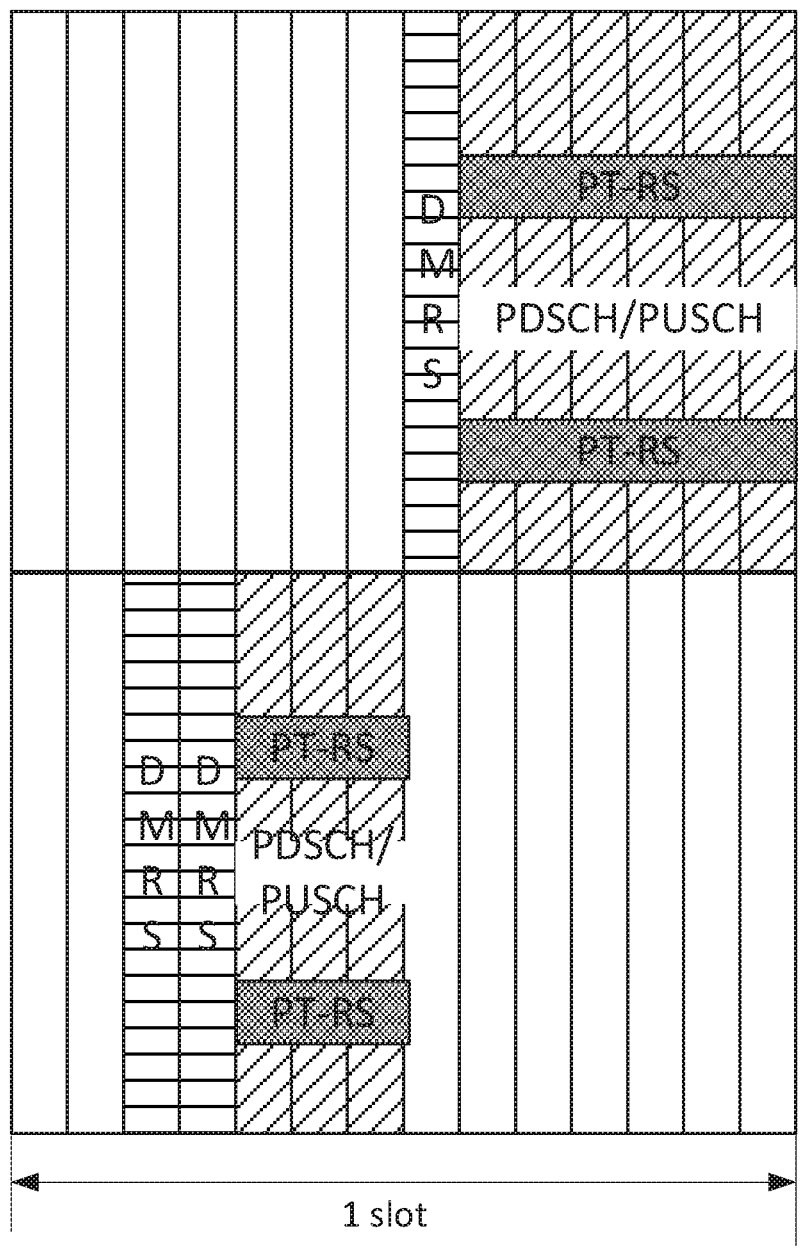
FIG. 11 illustrates an example for PT-RS transmission when frequency hopping is used, in accordance with an example.

FIG. 11 illustrates an example for PT-RS transmission when frequency hopping is used. In one embodiment, when the frequency hopping is enabled for the data channel, the PT-RS can also be used within the bandwidth where the UL and the DL data are transmitted. Additionally, for the two DM-RS symbols as shown in the first part of the slot in FIG. 11, the design can be applied for the case when one DM-RS symbol is configured in the first part of the slot.

Additionally, the Phase Tracking Reference Signal (PT-RS) is used to compensate for the phase noise and the frequency offset impact for the high frequency band, such as frequency bands greater than 6 gigahertz. The dynamic presence, the time density and the frequency density of the PT-RS can be determined by a Modulation and Coding Scheme (MCS), a subcarrier spacing (SCS) and an allocated bandwidth (BW). However, the phase noise characteristic may depend on the gNB and the UE implementation and could be different in a different gNB and a different UE. As such, defining a common MCS/SCS/BW for dynamic presence and time/frequency density mapping table can be utilized to reflect different phase noise levels in a different gNB and a different UE when determining the transmission of the PT-RS. In some embodiments, power boosting in DM-RS can be utilized to enhance the performance and provide power boosting for PT-RS.

In addition, a time domain Orthogonal Cover Code (TD-OCC) may be used in CSI-RS, DMRS and PUCCH. But due to phase noise impact, the time domain channel may be different in some symbols, enlisting the following solutions to compensate the phase noise impact for TD-OCC.

Control Signaling of PT-RS Generation

The dynamic presence and time/frequency density of PT-RS can be determined by the MCS, BW and SCS. One example is illustrated in the table in FIG. 12 which illustrates an exemplary table illustrating an example of a PT-RS configuration.

In an embodiment, with regard to different phase noise levels and forward compatibility support, there can be N number of tables used for the dynamic presence and the time/frequency density determination configured by higher layer signaling, where N is a positive integer. Then, the UE may report which table(s) to be recommended by the UE capability or other higher layer signaling. The table used for a UE can be configured by higher layer signaling or indicated in the Downlink Control Information (DCI) or a combination thereof.

Power Boosting of PT-RS

There may be some benefits for the DM-RS with power boosting. The power of each subcarrier of data and DM-RS may be different. For PT-RS, the same method may bring in some benefits, especially when the density of PT-RS is lower than that of the DM-RS.

In an embodiment, the ratio of energy per resource element (EPRE) of the PT-RS and the EPRE of the PDSCH can be configured by higher layer signaling, the DCI or a combination thereof. Accordingly, different transmission powers can be used in subcarriers used for the PT-RS and the PDSCH. Alternatively, the same EPRE for the DM-RS can be applied for the transmission of the PT-RS. In one case, the separate signaling for the EPRE of the DM-RS and the PT-RS can be configured to not be utilized.

In another embodiment, the PT-RS EPRE and the PDSCH EPRE or the PUSCH EPRE can be considered. Accordingly, the following PT-RS EPRE ratios can be considered. In one example, the ratio of the PT-RS EPRE to the PDSCH or PUSCH EPRE is equal to 0 decibels (dB) for the PT-RS antenna port associated with 1 MIMO layer or 1 DM-RS antenna port and 3 dB for the PT-RS associated with 2 MIMO layers or 2 DM-RS antenna ports. For example, in the case of a 2 MIMO layer transmission to the UE, the PT-RS may have a 3 dB higher transmission power relative to the power of the PDSCH or the PUSCH. The 3 dB power boosting is due to the use of a single antenna port transmission for the PT-RS compared to two DM-RS antenna port transmissions, which allows for full power allocation to the antenna port, while using power splitting between the DM-RS antenna ports.

In another example, the PT-RS power boosting can be further increased above 3 dB relative to the PDSCH or the PUSCH, if FDM multiplexing or zero power (ZP) PT-RS are used for PT-RS transmission. For example, in the case of when the zero power PT-RS is used with the same density as non-zero power (NZP) PT-RS, the PT-RS power boosting can be 6 dB relative to the PDSCH or the PUSCH.

In another example, the PT-RS EPRE ratio for the PDSCH is not defined for Quadrature Phase Shift Keying (QPSK) modulation to facilitate flexible power boosting to PT-RS. The UE may not assume constant EPRE for PT-RS REs across all OFDM symbol in the slot.

In another example, the PT-RS EPRE ratio to the PDSCH can be predefined for a 16 Quadrature Amplitude Modulation (QAM), a 64 QAM, a 256 QAM, a 512 QAM, and a 1024 QAM modulation, and all desired modulations for the PUSCH. The UE can assume constant EPRE for the PT-RS resource elements (REs) across all OFDM symbols in the slot.

Additionally, there can be an offset of $P_0$ for power control of the PT-RS and the PUSCH, where $P_0$ is a parameter configured by radio resource control (RRC) parameters. The simplified power control equation of PUSCH can be given by:

$$P_{tx} = \min(P_{max}, P_0 + \alpha \times PL).$$

Additionally, where PL indicates the pathloss including the gNB and UE beamforming gain, alpha ($\alpha$) represents a parameter configured by RRC, and $P_{max}$ is the maximum power that can be configured by higher layer or limited by its physical hardware.

Then the power control for PT-RS can be as follows:

$$P_{tx} = \min(P_{max}, P_0 | \alpha \times PL | \Delta).$$

Where $\Delta$ denotes the offset configured by higher layer signaling or DCI.

PT-RS for TD-OCC Based Signal

Figure 13:
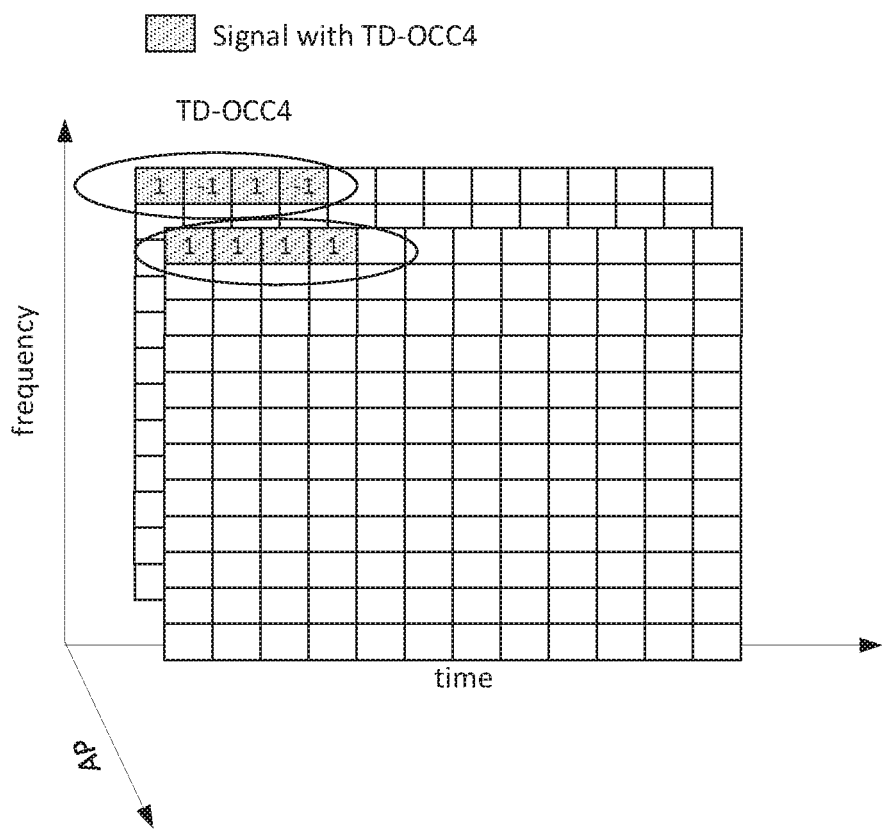
FIG. 13 illustrates an example for time division orthogonal cover code 4 (TD-OCC4), in accordance with an example.

The TD-OCC can be used to distinguish the signal from different antenna ports (APs). It is assumed that the channel can be similar in those subcarriers. FIG. 13 illustrates an example for time division orthogonal cover code 4 (TD-OCC4). In an embodiment, with regard to the phase noise impact, the PT-RS should be transmitted associated with the signal where there is TD-OCC. The PT-RS and the signal with TD-OCC can be multiplexed in a Frequency Division Multiplexing (FDM) manner. The PT-RS can share one or some of APs as the APs of the signal with TD-OCC, which can be pre-defined or configured by higher layer signaling or DCI. In this case, same TD-OCC is applied for the transmission of signal and PT-RS.

Figure 14:
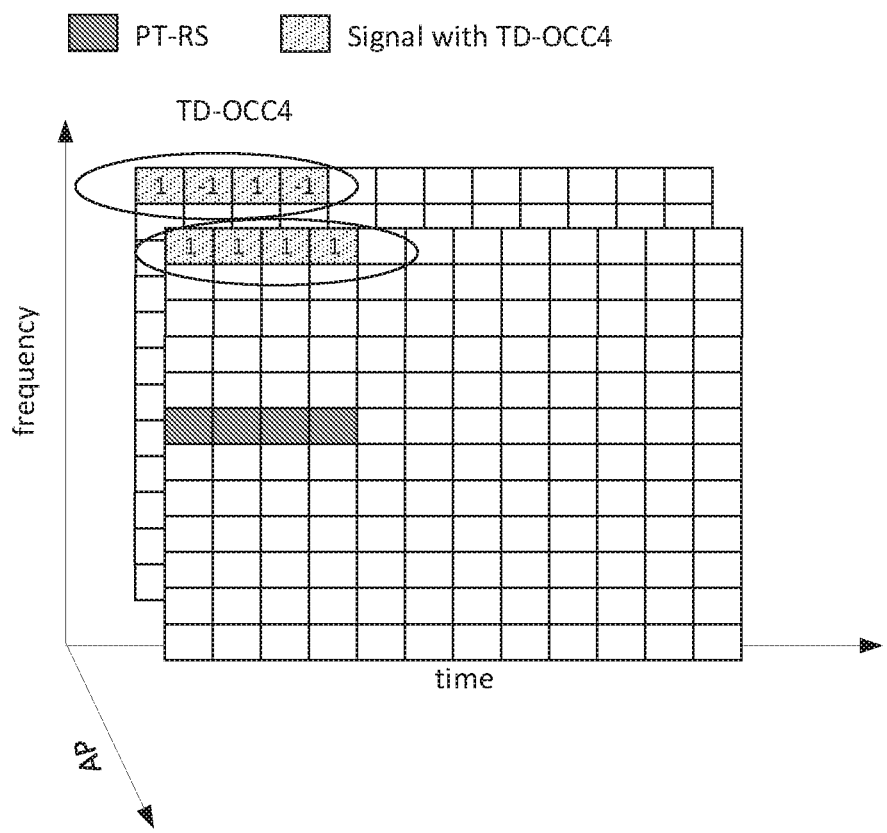
FIG. 14 illustrates an example for PT-RS associated with a time division orthogonal cover code (TD-OCC) signal, in accordance with an example.

FIG. 14 illustrates an example for PT-RS associated with a time division orthogonal cover code (TD-OCC) signal. In an embodiment, the dynamic presence and time/frequency density of PT-RS associated with signal with TD-OCC can be configured by higher layer signaling or DCI or determined by SCS and/or BW and/or MCS. If it is dynamically determined by SCS/BW/MCS, defining N tables in a first embodiment can be applied, where N is a positive integer.

Figure 15:
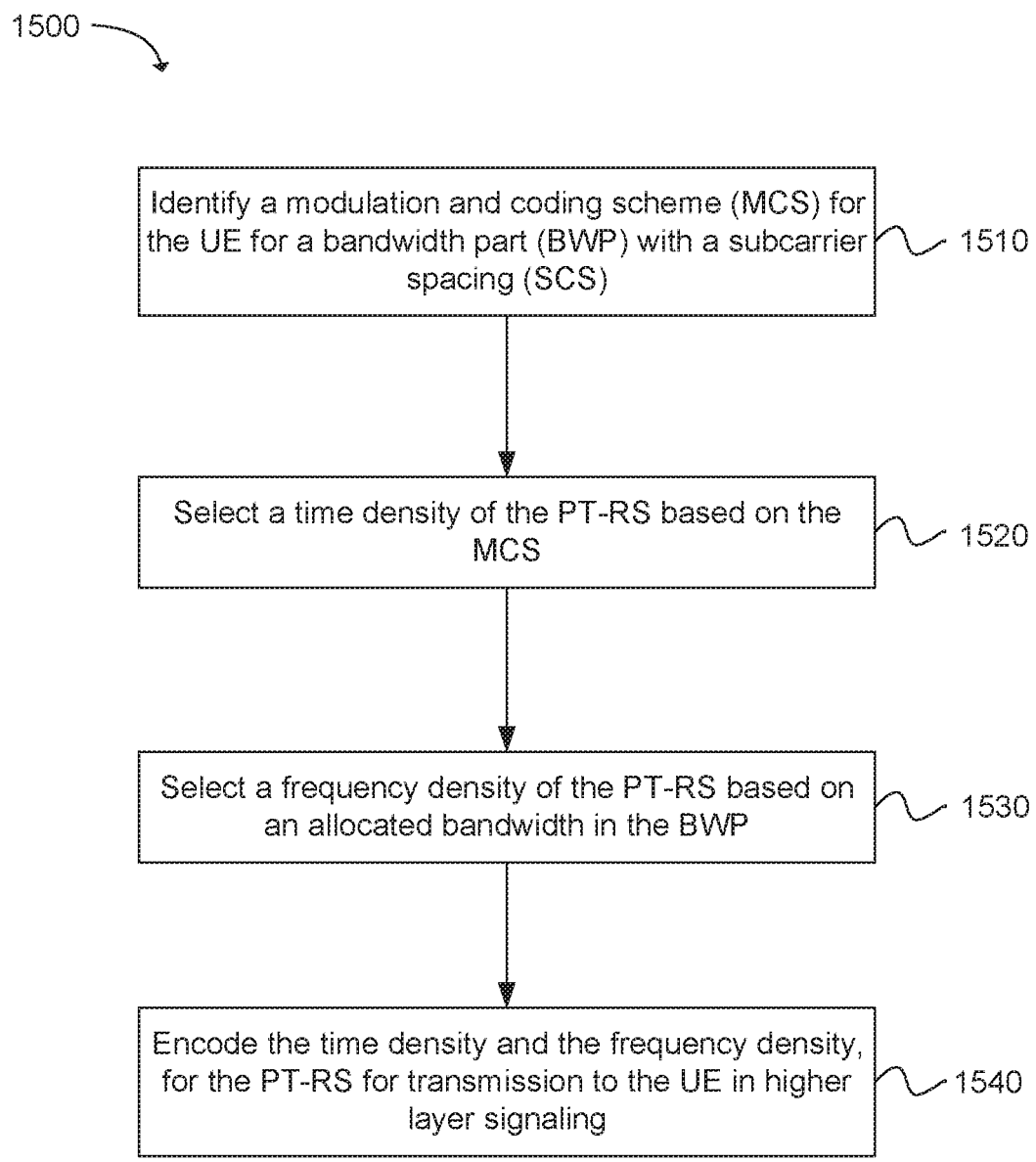
FIG. 15 depicts functionality of a next generation node B (gNB), operable to use phase tracking reference signals (PT-RS), in accordance with an example.

FIG. 15 depicts functionality 1500 of a next generation node B (gNB), operable to use phase tracking reference signals (PT-RS). The gNB can comprise one or more processors configured to determine a modulation and coding scheme (MCS) for the UE for a bandwidth part (BWP) with a subcarrier spacing (SCS) 1510. The gNB can comprise one or more processors configured to select a time density of the PT-RS based on the MCS 1520. The gNB can comprise one or more processors configured to select a frequency density of the PT-RS based on an allocated bandwidth in the BWP 1530. The gNB can comprise one or more processors configured to encode the time density and the frequency density, for the PT-RS for transmission to the UE in higher layer signaling 1540.

In one embodiment, the one or more processors are further configured to encode the PT-RS for transmission to the UE in the BWP, with the PT-RS starting at a first data symbol that is not used by a demodulation reference symbol (DM-RS) in a physical downlink shared channel (PDSCH) allocation.

In one embodiment, the one or more processors are further configured to encode the PT-RS for transmission to the UE at a resource element that is not used by a physical downlink control channel (PDCCH), a channel state information reference signal (CSI-RS), or a synchronization signal (SS) block.

In one embodiment, the one or more processors are further configured to determine an MCS and an SCS for the UE for each of a plurality of BWPs; select a time density of the PT-RS for each BWP in the plurality of BWPs, based on the MCS of the BWP; select a frequency density of the PT-RS for each BWP in the plurality of BWPs based on an allocated bandwidth of each respective BWP.

In one embodiment, the one or more processors are further configured to decode a time density of an uplink (UL) PT-RS, received from the UE, for a BWP, based on an MCS of the BWP; decode a frequency density of a UL PT-RS, received from the UE, for the BWP, based on the allocated bandwidth of the BWP.

In one embodiment, the one or more processors are further configured to decode a time density of an uplink (UL) PT-RS, received from the UE, for each BWP in a plurality of BWPs, based on an MCS of each respective BWP; decode a frequency density of a UL PT-RS, received from the UE, for each BWP in the plurality of BWPs based on the allocated bandwidth of each respective BWP.

In one embodiment, the one or more processors are further configured to decode the PT-RS received from the UE in the BWP, with the PT-RS starting at a first data symbol that is not used by a demodulation reference symbol (DM-RS) in a physical uplink shared channel (PUSCH) allocation.

In one embodiment, the one or more processors are further configured to determine a dynamic presence of the PT-RS based on the MCS, the allocated bandwidth in the BWP and the presence of a signal with a time domain orthogonal cover code (TD-OCC).

In one embodiment, the one or more processors are further configured to encode the PT-RS for transmission to the UE in the BWP when the TD-OCC is not transmitted.

Figure 16:
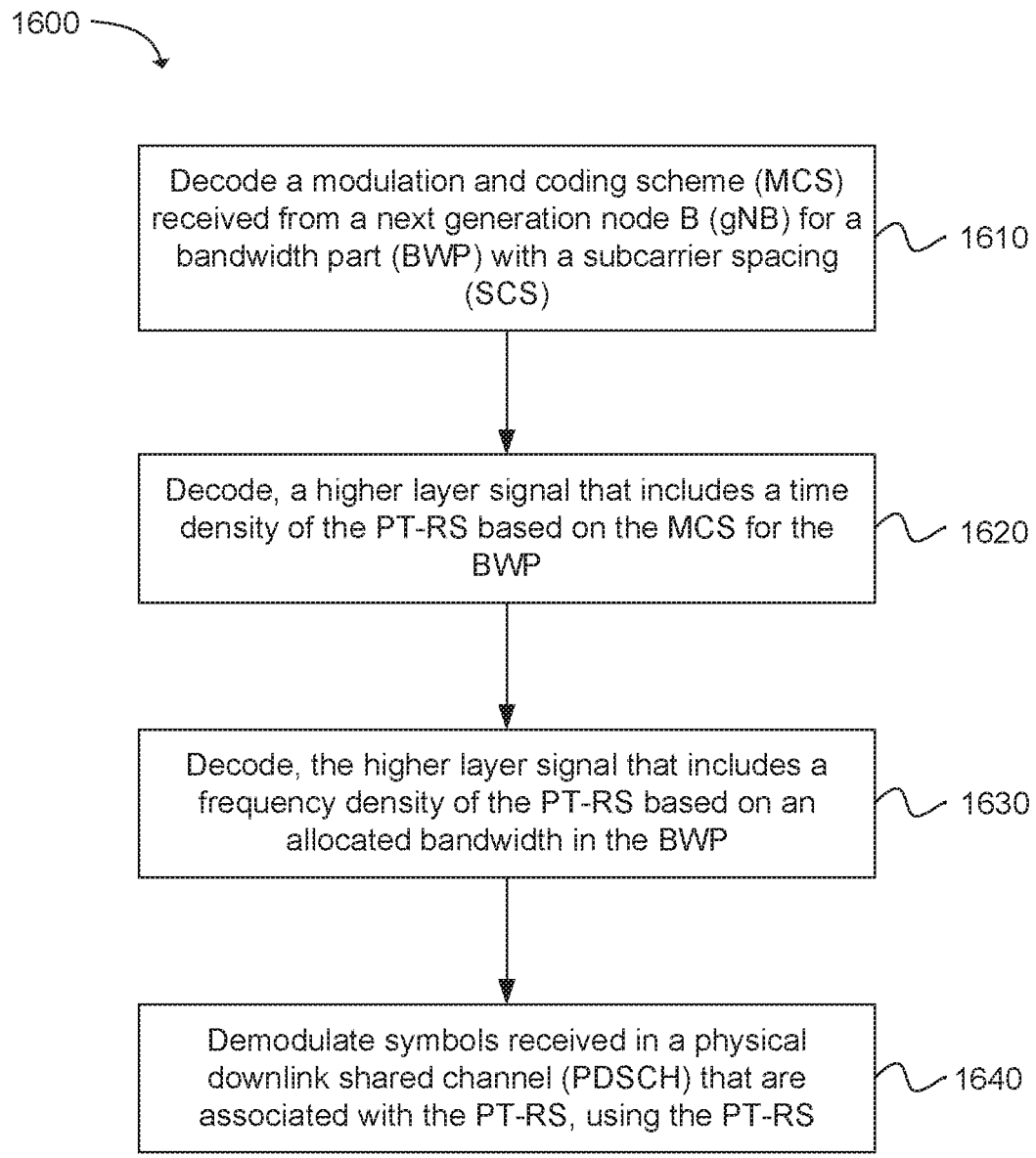
FIG. 16 depicts functionality of a user equipment (UE), operable to use phase tracking reference signals (PT-RS), in accordance with an example.

FIG. 16 depicts functionality 1600 of a user equipment (UE), operable to use phase tracking reference signals (PT-RS). The UE can comprise one or more processors configured to decode a modulation and coding scheme (MCS) received from a next generation node B (gNB) for a bandwidth part (BWP) with a subcarrier spacing (SCS) 1610. The UE can comprise one or more processors configured to decode, a higher layer signal that includes a time density of the PT-RS based on the MCS for the BWP 1620. The UE can comprise one or more processors configured to decode, the higher layer signal that includes a frequency density of the PT-RS based on an allocated bandwidth in the BWP 1630. The UE can comprise one or more processors configured to demodulate symbols received in a physical downlink shared channel (PDSCH) that are associated with the PT-RS, using the PT-RS 1640.

In one embodiment, the one or more processors are further configured to decode the PT-RS received from the gNB in the BWP, with the PT-RS starting at a first data symbol after a demodulation reference symbol (DM-RS) in a physical downlink shared channel (PDSCH) allocation.

In one embodiment, the one or more processors are further configured to decode the symbols in the PDSCH, wherein the PT-RS received from the gNB in the PDSCH is not included in a resource element that is used for a physical downlink control channel (PDCCH), a channel state information reference signal (CSI-RS), or a synchronization signal (SS) block.

In one embodiment, the one or more processors are further configured to decode an MCS and an SCS for the UE for each of a plurality of BWPs; decode a time density of the PT-RS for each BWP in the plurality of BWPs, based on the MCS of the BWP; decode a frequency density of the PT-RS for each BWP in the plurality of BWPs based on an allocated bandwidth of each respective BWP.

In one embodiment, the one or more processors are further configured to encode a time density of an uplink (UL) PT-RS, for transmission to the gNB, for a BWP, based on an MCS of the BWP; encode a frequency density of a UL PT-RS, for transmission to the gNB, for the BWP, based on the allocated bandwidth of the BWP.

In one embodiment, the one or more processors are further configured to encode a time density of an uplink (UL) PT-RS, for transmission to the gNB, for each BWP in a plurality of BWPs, based on an MCS of each respective BWP; encode a frequency density of a UL PT-RS, for transmission to the gNB, for each BWP in the plurality of BWPs based on the allocated bandwidth of each respective BWP.

In one embodiment, the one or more processors are further configured to encode the PT-RS, for transmission to the gNB, with the PT-RS starting at a first data symbol that is not used by a demodulation reference symbol (DM-RS) in a physical uplink shared channel (PUSCH).

In one embodiment, the UE includes an antenna, a touch sensitive display screen, a speaker, a microphone, a graphics processor, an application processor, an internal memory, a non-volatile memory port, or combinations thereof.

Figure 17:
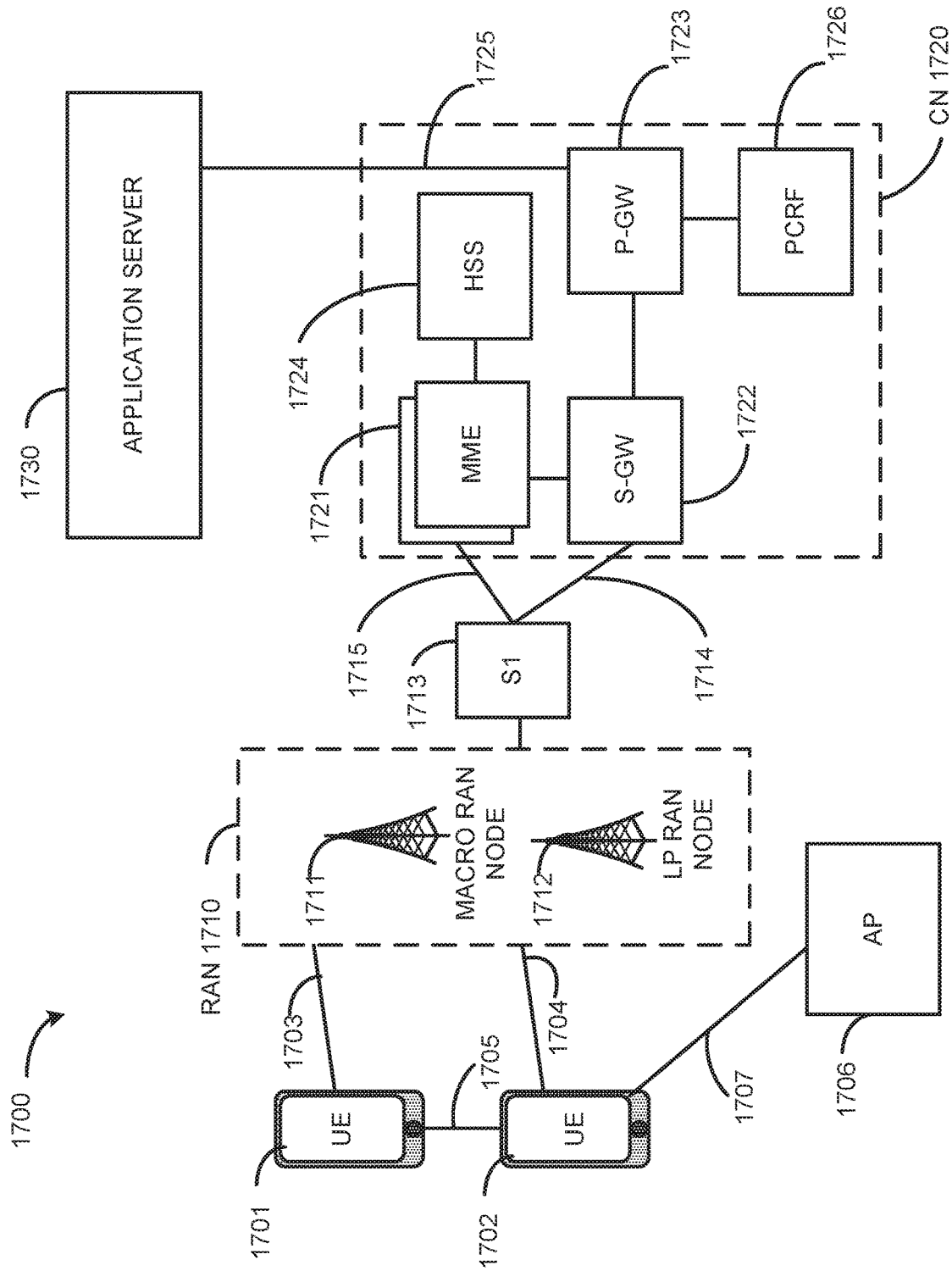
FIG. 17 illustrates an architecture of a network in accordance with an example.

FIG. 17 illustrates architecture of a system 1700 of a network in accordance with some embodiments. The system 1700 is shown to include a user equipment (UE) 1701 and a UE 1702. The UEs 1701 and 1702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1701 and 1702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1701 and 1702 may be configured to connect, e.g., communicatively couple, with a radio access network (RAN) 1710—the RAN 1710 may be, for example, an Evolved Universal Mobile Telecommunications System (UMTS) Terrestrial Radio Access Network (E-UTRAN), a Ne8Gen RAN (NG RAN), or some other type of RAN. The UEs 1701 and 1702 utilize connections 1703 and 1704, respectively, each of which comprises a physical communications interface or layer (discussed in further detail below); in this example, the connections 1703 and 1704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1701 and 1702 may further directly exchange communication data via a ProSe interface 1705. The ProSe interface 1705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1702 is shown to be configured to access an access point (AP) 1706 via connection 1707. The connection 1707 can comprise a local wireless connection, such as a connection consistent with any IEEE 802.11 protocol, wherein the AP 1706 would comprise a wireless fidelity (WiFi®) router. In this example, the AP 1706 is shown to be connected to the Internet without connecting to the core network of the wireless system (described in further detail below).

The RAN 1710 can include one or more access nodes that enable the connections 1703 and 1704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1710 may include one or more RAN nodes for providing macrocells, e.g., macro RAN node 1711, and one or more RAN nodes for providing femtocells or picocells (e.g., cells having smaller coverage areas, smaller user capacity, or higher bandwidth compared to macrocells), e.g., low power (LP) RAN node 1712.

Any of the RAN nodes 1711 and 1712 can terminate the air interface protocol and can be the first point of contact for the UEs 1701 and 1702. In some embodiments, any of the RAN nodes 1711 and 1712 can fulfill various logical functions for the RAN 1710 including, but not limited to, radio network controller (RNC) functions such as radio bearer management, uplink and downlink dynamic radio resource management and data packet scheduling, and mobility management.

In accordance with some embodiments, the UEs 1701 and 1702 can be configured to communicate using Orthogonal Frequency-Division Multiplexing (OFDM) communication signals with each other or with any of the RAN nodes 1711 and 1712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1711 and 1712 to the UEs 1701 and 1702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1701 and 1702. The physical downlink control channel (PDCCH) may carry information about the transport format and resource allocations related to the PDSCH channel, among other things. It may also inform the UEs 1701 and 1702 about the transport format, resource allocation, and H-ARQ (Hybrid Automatic Repeat Request) information related to the uplink shared channel. Typically, downlink scheduling (assigning control and shared channel resource blocks to the UE 1702 within a cell) may be performed at any of the RAN nodes 1711 and 1712 based on channel quality information fed back from any of the UEs 1701 and 1702. The downlink resource assignment information may be sent on the PDCCH used for (e.g., assigned to) each of the UEs 1701 and 1702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1710 is shown to be communicatively coupled to a core network (CN) 1720—via an S1 interface 1713. In embodiments, the CN 1720 may be an evolved packet core (EPC) network, a Next Gen Packet Core (NPC) network, or some other type of CN. In this embodiment the S1 interface 1713 is split into two parts: the S1-U interface 1714, which carries traffic data between the RAN nodes 1711 and 1712 and the serving gateway (S-GW) 1722, and the S1-mobility management entity (MME) interface 1715, which is a signaling interface between the RAN nodes 1711 and 1712 and MMEs 1721.

In this embodiment, the CN 1720 comprises the MMEs 1721, the S-GW 1722, the Packet Data Network (PDN) Gateway (P-GW) 1723, and a home subscriber server (HSS) 1724. The MMEs 1721 may be similar in function to the control plane of legacy Serving General Packet Radio Service (GPRS) Support Nodes (SGSN). The MMEs 1721 may manage mobility aspects in access such as gateway selection and tracking area list management. The HSS 1724 may comprise a database for network users, including subscription-related information to support the network entities' handling of communication sessions. The CN 1720 may comprise one or several HSSs 1724, depending on the number of mobile subscribers, on the capacity of the equipment, on the organization of the network, etc. For example, the HSS 1724 can provide support for routing/roaming, authentication, authorization, naming/addressing resolution, location dependencies, etc.

The S-GW 1722 may terminate the S1 interface 1713 towards the RAN 1710, and routes data packets between the RAN 1710 and the CN 1720. In addition, the S-GW 1722 may be a local mobility anchor point for inter-RAN node handovers and also may provide an anchor for inter-3GPP mobility. Other responsibilities may include lawful intercept, charging, and some policy enforcement.

The P-GW 1723 may terminate an SGi interface toward a PDN. The P-GW 1723 may route data packets between the EPC network 1723 and external networks such as a network including the application server 1730 (alternatively referred to as application function (AF)) via an Internet Protocol (IP) interface 1725. Generally, the application server 1730 may be an element offering applications that use IP bearer resources with the core network (e.g., UMTS Packet Services (PS) domain, LTE PS data services, etc.). In this embodiment, the P-GW 1723 is shown to be communicatively coupled to an application server 1730 via an IP communications interface 1725. The application server 1730 can also be configured to support one or more communication services (e.g., Voice-over-Internet Protocol (VoIP) sessions, PTT sessions, group communication sessions, social networking services, etc.) for the UEs 1701 and 1702 via the CN 1720.

The P-GW 1723 may further be a node for policy enforcement and charging data collection. Policy and Charging Enforcement Function (PCRF) 1726 is the policy and charging control element of the CN 1720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1726 may be communicatively coupled to the application server 1730 via the P-GW 1723. The application server 1730 may signal the PCRF 1726 to indicate a new service flow and select the appropriate Quality of Service (QoS) and charging parameters. The PCRF 1726 may provision this rule into a Policy and Charging Enforcement Function (PCEF) (not shown) with the appropriate traffic flow template (TFT) and QoS class of identifier (QCI), which commences the QoS and charging as specified by the application server 1730.

Figure 18:
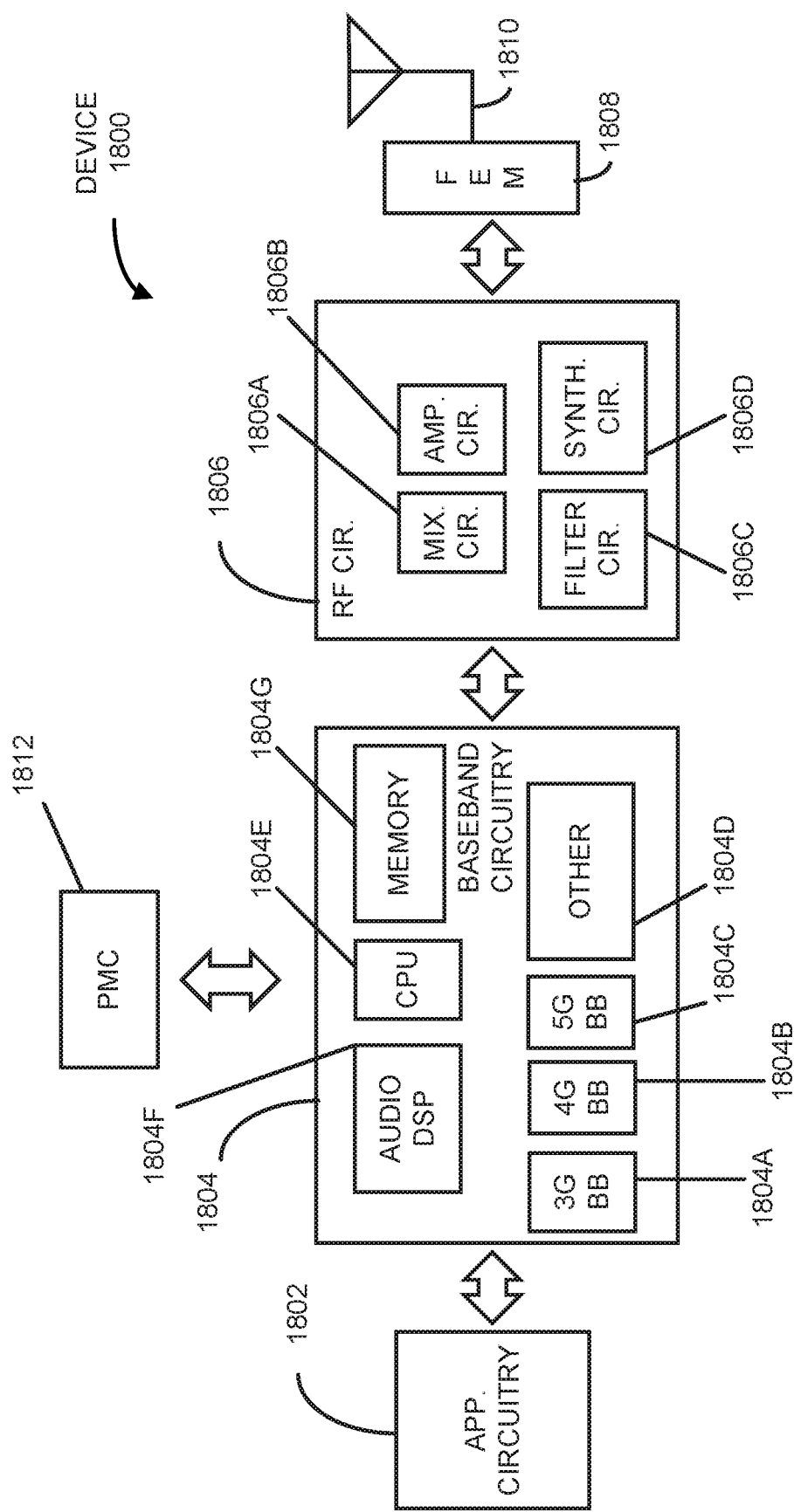
FIG. 18 illustrates a diagram of a wireless device (e.g., UE) and a base station (e.g., eNodeB) in accordance with an example.

FIG. 18 illustrates example components of a device 1800 in accordance with some embodiments. In some embodiments, the device 1800 may include application circuitry 1802, baseband circuitry 1804, Radio Frequency (RF) circuitry 1806, front-end module (FEM) circuitry 1808, one or more antennas 1810, and power management circuitry (PMC) 1812 coupled together at least as shown. The components of the illustrated device 1800 may be included in a UE or a RAN node. In some embodiments, the device 1800 may include less elements (e.g., a RAN node may not utilize application circuitry 1802, and instead include a processor/controller to process IP data received from an EPC). In some embodiments, the device 1800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1802 may include one or more application processors. For example, the application circuitry 1802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1800. In some embodiments, processors of application circuitry 1802 may process IP data packets received from an EPC.

The baseband circuitry 1804 may include circuitry such as, but not limited to, one or more single-core or multi-core processors. The baseband circuitry 1804 may include one or more baseband processors or control logic to process baseband signals received from a receive signal path of the RF circuitry 1806 and to generate baseband signals for a transmit signal path of the RF circuitry 1806. Baseband processing circuitry 1804 may interface with the application circuitry 1802 for generation and processing of the baseband signals and for controlling operations of the RF circuitry 1806. For example, in some embodiments, the baseband circuitry 1804 may include a third generation (3G) baseband processor 1804A, a fourth generation (4G) baseband processor 1804B, a fifth generation (5G) baseband processor 1804C, or other baseband processor(s) 1804D for other existing generations, generations in development or to be developed in the future (e.g., second generation (2G), sixth generation (6G), etc.). The baseband circuitry 1804 (e.g., one or more of baseband processors 1804A-D) may handle various radio control functions that enable communication with one or more radio networks via the RF circuitry 1806. In other embodiments, some or all of the functionality of baseband processors 1804A-D may be included in modules stored in the memory 1804G and executed via a Central Processing Unit (CPU) 1804E. The radio control functions may include, but are not limited to, signal modulation/demodulation, encoding/decoding, radio frequency shifting, etc. In some embodiments, modulation/demodulation circuitry of the baseband circuitry 1804 may include Fast-Fourier Transform (FFT), precoding, or constellation mapping/demapping functionality. In some embodiments, encoding/decoding circuitry of the baseband circuitry 1804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1804 may include one or more audio digital signal processor(s) (DSP) 1804F. The audio DSP(s) 1804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1804 and the application circuitry 1802 may be implemented together such as, for example, on a system on a chip (SOC).

In some embodiments, the baseband circuitry 1804 may provide for communication compatible with one or more radio technologies. For example, in some embodiments, the baseband circuitry 1804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1804 is configured to support radio communications of more than one wireless protocol may be referred to as multi-mode baseband circuitry.

RF circuitry 1806 may enable communication with wireless networks using modulated electromagnetic radiation through a non-solid medium. In various embodiments, the RF circuitry 1806 may include switches, filters, amplifiers, etc. to facilitate the communication with the wireless network. RF circuitry 1806 may include a receive signal path which may include circuitry to down-convert RF signals received from the FEM circuitry 1808 and provide baseband signals to the baseband circuitry 1804. RF circuitry 1806 may also include a transmit signal path which may include circuitry to up-convert baseband signals provided by the baseband circuitry 1804 and provide RF output signals to the FEM circuitry 1808 for transmission.

In some embodiments, the receive signal path of the RF circuitry 1806 may include mixer circuitry 1806*a*, amplifier circuitry 1806*b* and filter circuitry 1806*c*. In some embodiments, the transmit signal path of the RF circuitry 1806 may include filter circuitry 1806*c* and mixer circuitry 1806*a*. RF circuitry 1806 may also include synthesizer circuitry 1806*d* for synthesizing a frequency for use by the mixer circuitry 1806*a* of the receive signal path and the transmit signal path. In some embodiments, the mixer circuitry 1806*a* of the receive signal path may be configured to down-convert RF signals received from the FEM circuitry 1808 based on the synthesized frequency provided by synthesizer circuitry 1806*d*. The amplifier circuitry 1806*b* may be configured to amplify the down-converted signals and the filter circuitry 1806*c* may be a low-pass filter (LPF) or band-pass filter (BPF) configured to remove unwanted signals from the down-converted signals to generate output baseband signals. Output baseband signals may be provided to the baseband circuitry 1804 for further processing. In some embodiments, the output baseband signals may be zero-frequency baseband signals, although this is not a necessity. In some embodiments, mixer circuitry 1806a of the receive signal path may comprise passive mixers, although the scope of the embodiments is not limited in this respect.

In some embodiments, the mixer circuitry 1806a of the transmit signal path may be configured to up-convert input baseband signals based on the synthesized frequency provided by the synthesizer circuitry 1806d to generate RF output signals for the FEM circuitry 1808. The baseband signals may be provided by the baseband circuitry 1804 and may be filtered by filter circuitry 1806c.

In some embodiments, the mixer circuitry 1806a of the receive signal path and the mixer circuitry 1806a of the transmit signal path may include two or more mixers and may be arranged for quadrature downconversion and upconversion, respectively. In some embodiments, the mixer circuitry 1806a of the receive signal path and the mixer circuitry 1806a of the transmit signal path may include two or more mixers and may be arranged for image rejection (e.g., Hartley image rejection). In some embodiments, the mixer circuitry 1806a of the receive signal path and the mixer circuitry 1806a may be arranged for direct downconversion and direct upconversion, respectively. In some embodiments, the mixer circuitry 1806a of the receive signal path and the mixer circuitry 1806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1806 may include analog-to-digital converter (ADC) and digital-to-analog converter (DAC) circuitry and the baseband circuitry 1804 may include a digital baseband interface to communicate with the RF circuitry 1806.

In some dual-mode embodiments, a separate radio IC circuitry may be provided for processing signals for each spectrum, although the scope of the embodiments is not limited in this respect.

In some embodiments, the synthesizer circuitry 1806d may be a fractional-N synthesizer or a fractional N/N+1 synthesizer, although the scope of the embodiments is not limited in this respect as other types of frequency synthesizers may be suitable. For example, synthesizer circuitry 1806d may be a delta-sigma synthesizer, a frequency multiplier, or a synthesizer comprising a phase-locked loop with a frequency divider.

The synthesizer circuitry 1806d may be configured to synthesize an output frequency for use by the mixer circuitry 1806a of the RF circuitry 1806 based on a frequency input and a divider control input. In some embodiments, the synthesizer circuitry 1806d may be a fractional N/N+1 synthesizer.

In some embodiments, frequency input may be provided by a voltage controlled oscillator (VCO), although that is not a necessity. Divider control input may be provided by either the baseband circuitry 1804 or the applications processor 1802 depending on the desired output frequency. In some embodiments, a divider control input (e.g., N) may be determined from a look-up table based on a channel indicated by the applications processor 1802.

Synthesizer circuitry 1806d of the RF circuitry 1806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1806 may include an IQ/polar converter.

FEM circuitry 1808 may include a receive signal path which may include circuitry configured to operate on RF signals received from one or more antennas 1810, amplify the received signals and provide the amplified versions of the received signals to the RF circuitry 1806 for further processing. FEM circuitry 1808 may also include a transmit signal path which may include circuitry configured to amplify signals for transmission provided by the RF circuitry 1806 for transmission by one or more of the one or more antennas 1810. In various embodiments, the amplification through the transmit or receive signal paths may be done solely in the RF circuitry 1806, solely in the FEM 1808, or in both the RF circuitry 1806 and the FEM 1808.

In some embodiments, the FEM circuitry 1808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1806). The transmit signal path of the FEM circuitry 1808 may include a power amplifier (PA) to amplify input RF signals (e.g., provided by RF circuitry 1806), and one or more filters to generate RF signals for subsequent transmission (e.g., by one or more of the one or more antennas 1810).

In some embodiments, the PMC 1812 may manage power provided to the baseband circuitry 1804. In particular, the PMC 1812 may control power-source selection, voltage scaling, battery charging, or DC-to-DC conversion. The PMC 1812 may often be included when the device 1800 is capable of being powered by a battery, for example, when the device is included in a UE. The PMC 1812 may increase the power conversion efficiency while providing desirable implementation size and heat dissipation characteristics.

While FIG. 18 shows the PMC 1812 coupled only with the baseband circuitry 1804. However, in other embodiments, the PMC 1812 may be additionally or alternatively coupled with, and perform similar power management operations for, other components such as, but not limited to, application circuitry 1802, RF circuitry 1806, or FEM 1808.

In some embodiments, the PMC 1812 may control, or otherwise be part of, various power saving mechanisms of the device 1800. For example, if the device 1800 is in an RRC_Connected state, where it is still connected to the RAN node as it expects to receive traffic shortly, then it may enter a state known as Discontinuous Reception Mode (DRX) after a period of inactivity. During this state, the device 1800 may power down for brief intervals of time and thus save power.

If there is no data traffic activity for an extended period of time, then the device 1800 may transition off to an RRC_Idle state, where it disconnects from the network and does not perform operations such as channel quality feedback, handover, etc. The device 1800 goes into a very low power state and it performs paging where again it periodically wakes up to listen to the network and then powers down again. The device 1800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1802 and processors of the baseband circuitry 1804 may be used to execute elements of one or more instances of a protocol stack. For example, processors of the baseband circuitry 1804, alone or in combination, may be used execute Layer 3, Layer 2, or Layer 1 functionality, while processors of the application circuitry 1804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 19:
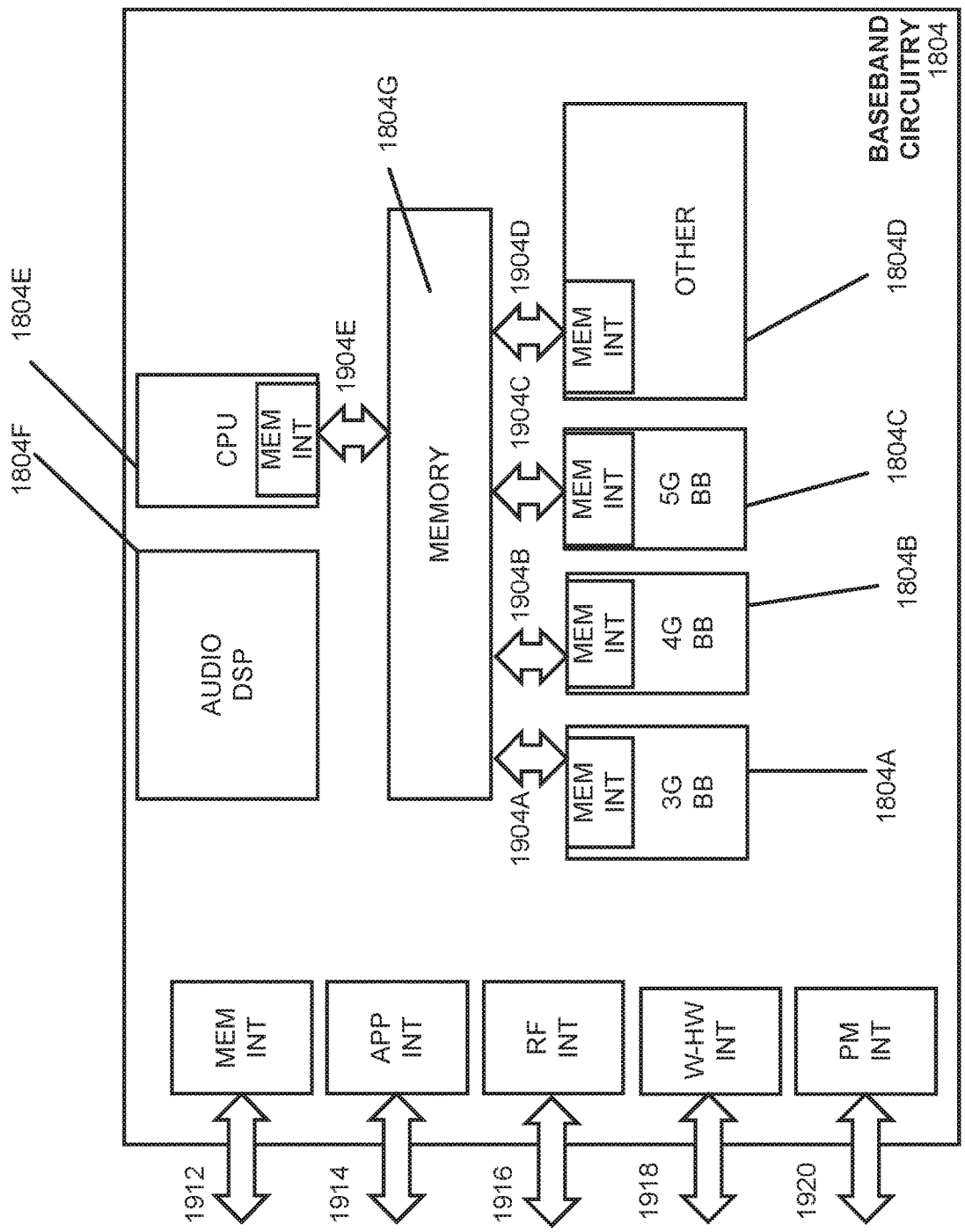
FIG. 19 illustrates example interfaces of baseband circuitry in accordance with an example.

FIG. 19 illustrates example interfaces of baseband circuitry in accordance with some embodiments. As discussed above, the baseband circuitry 1804 of FIG. 18 may comprise processors 1804A-1804E and a memory 1804G utilized by said processors. Each of the processors 1804A-1804E may include a memory interface, 1904A-1904E, respectively, to send/receive data to/from the memory 1804G.

The baseband circuitry 1804 may further include one or more interfaces to communicatively couple to other circuitries/devices, such as a memory interface 1912 (e.g., an interface to send/receive data to/from memory external to the baseband circuitry 1804), an application circuitry interface 1914 (e.g., an interface to send/receive data to/from the application circuitry 1802 of FIG. 18), an RF circuitry interface 1916 (e.g., an interface to send/receive data to/from RF circuitry 1806 of FIG. 18), a wireless hardware connectivity interface 1918 (e.g., an interface to send/receive data to/from Near Field Communication (NFC) components, Bluetooth® components (e.g., Bluetooth® Low Energy), Wi-Fi® components, and other communication components), and a power management interface 1920 (e.g., an interface to send/receive power or control signals to/from the PMC 1812.

Figure 20:
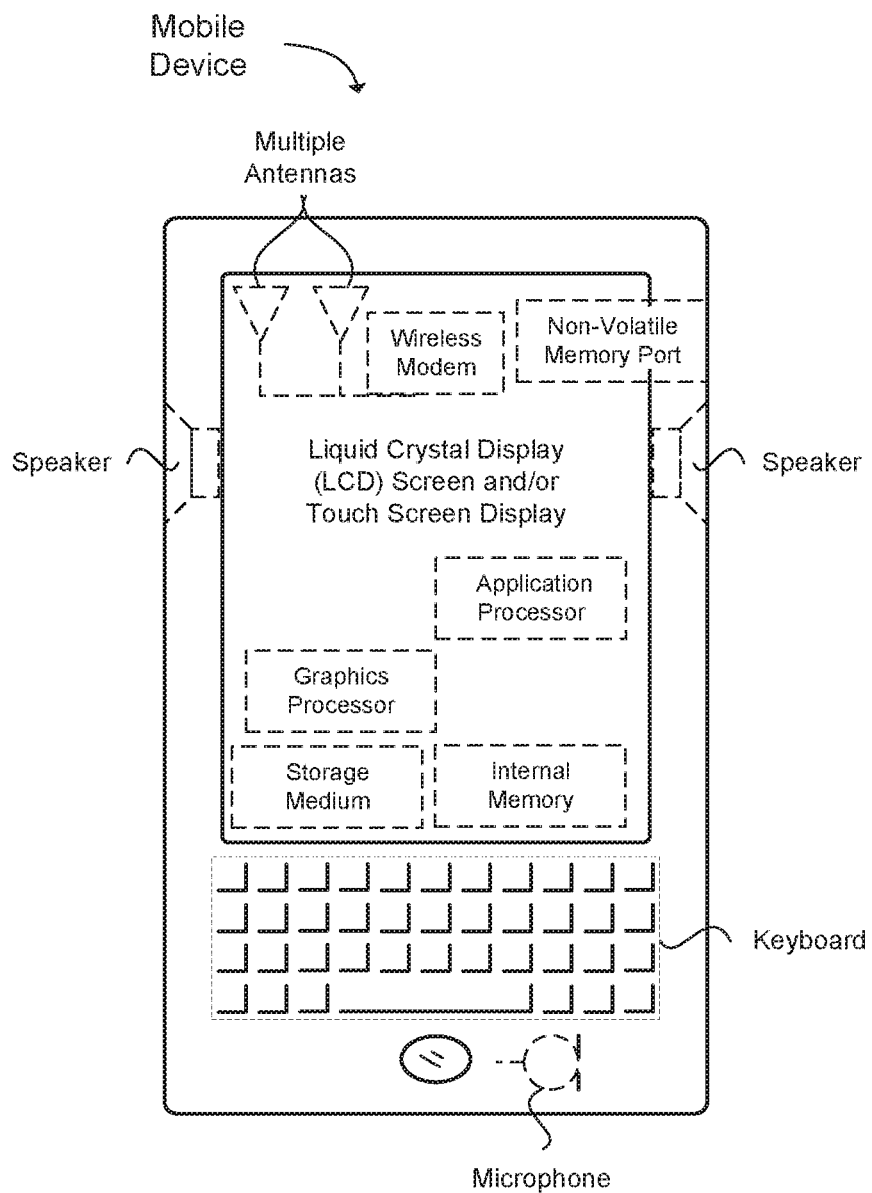
FIG. 20 illustrates a diagram of a wireless device (e.g., UE) in accordance with an example.

FIG. 20 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 20 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a next generation node B (gNB), operable to use phase tracking reference signals (PT-RS), the apparatus comprising: one or more processors configured to: identify a modulation and coding scheme (MCS) for the UE for a bandwidth part (BWP) with a subcarrier spacing (SCS); select a time density of the PT-RS based on the MCS; select a frequency density of the PT-RS based on an allocated bandwidth in the BWP; and encode the time density and the frequency density, for the PT-RS for transmission to the UE in higher layer signaling; and a memory interface configured to send to a memory the time density based on the MCS, and frequency density based on the allocated bandwidth.

Example 2 includes the apparatus of a gNB of example 1, wherein the one or more processors are further configured to encode the PT-RS for transmission to the UE in the BWP, with the PT-RS starting at a first data symbol that is not used by a demodulation reference symbol (DM-RS) in a physical downlink shared channel (PDSCH) allocation.

Example 3 includes the apparatus of a gNB of example 1 or 2, wherein the one or more processors are further configured to encode the PT-RS for transmission to the UE at a resource element that is not used by a physical downlink control channel (PDCCH), a channel state information reference signal (CSI-RS), or a synchronization signal (SS) block.

Example 4 includes the apparatus of a gNB of example 1, wherein the one or more processors are further configured to: determine an MCS and an SCS for the UE for each of a plurality of BWPs; select a time density of the PT-RS for each BWP in the plurality of BWPs, based on the MCS of the BWP; and select a frequency density of the PT-RS for each BWP in the plurality of BWPs based on an allocated bandwidth of each respective BWP.

Example 5 includes the apparatus of a gNB of example 1 or 2, wherein the one or more processors are further configured to: decode a time density of an uplink (UL) PT-RS, received from the UE, for a BWP, based on an MCS of the BWP; and decode a frequency density of a UL PT-RS, received from the UE, for the BWP, based on the allocated bandwidth of the BWP.

Example 6 includes the apparatus of a gNB of example 1 or 2, wherein the one or more processors are further configured to: decode a time density of an uplink (UL) PT-RS, received from the UE, for each BWP in a plurality of BWPs, based on an MCS of each respective BWP; and decode a frequency density of a UL PT-RS, received from the UE, for each BWP in the plurality of BWPs based on the allocated bandwidth of each respective BWP.

Example 7 includes the apparatus of a gNB of example 1, wherein the one or more processors are further configured to decode the PT-RS received from the UE in the BWP, with the PT-RS starting at a first data symbol that is not used by a demodulation reference symbol (DM-RS) in a physical uplink shared channel (PUSCH) allocation.

Example 8 includes the apparatus of a gNB of example 1, wherein the one or more processors are further configured to determine a dynamic presence of the PT-RS based on the MCS, the allocated bandwidth in the BWP and the presence of a signal with a time domain orthogonal cover code (TD-OCC).

Example 9 includes the apparatus of a gNB of example 8, wherein the one or more processors are further configured to encode the PT-RS for transmission to the UE in the BWP when the TD-OCC is not transmitted.

Example 10 includes an apparatus of a user equipment (UE), operable to use phase tracking reference signals (PT-RS), the apparatus comprising: one or more processors configured to: decode a modulation and coding scheme (MCS) received from a next generation node B (gNB) for a bandwidth part (BWP) with a subcarrier spacing (SCS); decode, a higher layer signal that includes a time density of the PT-RS based on the MCS for the BWP; decode, the higher layer signal that includes a frequency density of the PT-RS based on an allocated bandwidth in the BWP; and demodulate symbols received in a physical downlink shared channel (PDSCH) that are associated with the PT-RS, using the PT-RS; and a memory interface configured to send to a memory the time density based on the MCS and the frequency density based on allocated bandwidth.

Example 11 includes the apparatus of a UE of example 10, wherein the one or more processors are further configured to decode the PT-RS received from the gNB in the BWP, with the PT-RS starting at a first data symbol after a demodulation reference symbol (DM-RS) in a physical downlink shared channel (PDSCH) allocation.

Example 12 includes the apparatus of a UE of example 10 or 11, wherein the one or more processors are further configured to decode the symbols in the PDSCH, wherein the PT-RS received from the gNB in the PDSCH is not included in a resource element that is used for a physical downlink control channel (PDCCH), a channel state information reference signal (CSI-RS), or a synchronization signal (SS) block.

Example 13 includes the apparatus of a UE of example 10, wherein the one or more processors are further configured to: decode an MCS and an SCS for the UE for each of a plurality of BWPs; decode a time density of the PT-RS for each BWP in the plurality of BWPs, based on the MCS of the BWP; and decode a frequency density of the PT-RS for each BWP in the plurality of BWPs based on an allocated bandwidth of each respective BWP.

Example 14 includes the apparatus of a UE of example 10 or 11, wherein the one or more processors are further configured to: encode a time density of an uplink (UL) PT-RS, for transmission to the gNB, for a BWP, based on an MCS of the BWP; and encode a frequency density of a UL PT-RS, for transmission to the gNB, for the BWP, based on the allocated bandwidth of the BWP.

Example 15 includes the apparatus of a UE of example 10 or 11, wherein the one or more processors are further configured to: encode a time density of an uplink (UL) PT-RS, for transmission to the gNB, for each BWP in a plurality of BWPs, based on an MCS of each respective BWP; and encode a frequency density of a UL PT-RS, for transmission to the gNB, for each BWP in the plurality of BWPs based on the allocated bandwidth of each respective BWP.

Example 16 includes the apparatus of a UE of example 10 or 11, wherein the one or more processors are further configured to encode the PT-RS, for transmission to the gNB, with the PT-RS starting at a first data symbol that is not used by a demodulation reference symbol (DM-RS) in a physical uplink shared channel (PUSCH).

Example 17 includes the apparatus of example 10, wherein the UE includes an antenna, a touch sensitive display screen, a speaker, a microphone, a graphics processor, an application processor, an internal memory, a non-volatile memory port, or combinations thereof.

Example 18 includes the at least one machine readable storage medium having instructions embodied thereon for a next generation node B (gNB), operable to use phase tracking reference signals (PT-RS), the instructions thereon when executed by one or more processors at the UE perform the following: select a time density of the PT-RS based on a modulation and coding scheme (MCS); select a frequency density of the PT-RS based on an allocated bandwidth of the BWP; and encode the time density and the frequency density, for the PT-RS for transmission to the UE in higher layer signaling.

Example 19 includes the at least one machine readable storage medium in example 18 further comprising instructions, that when executed by one or more processors at the gNB, perform the following: encode the PT-RS for transmission to the UE in the BWP, with the PT-RS starting at a first data symbol that is not used by a demodulation reference symbol (DM-RS) in a physical downlink shared channel (PDSCH) allocation.

Example 20 includes the at least one machine readable storage medium in example 18 or 19 further comprising instructions, that when executed by one or more processors at the gNB, perform the following: encode the PT-RS for transmission to the UE at a resource element that is not used by a physical downlink control channel (PDCCH), a channel state information reference signal (CSI-RS), or a synchronization signal (SS) block.

Example 21 includes the at least one machine readable storage medium in example 18 or 19 further comprising instructions, that when executed by one or more processors at the gNB, perform the following: determine an MCS and an SCS for the UE for each of a plurality of BWPs; select a time density of the PT-RS for each BWP in the plurality of BWPs, based on the MCS of the BWP; and select a frequency density of the PT-RS for each BWP in the plurality of BWPs based on an allocated bandwidth of each respective BWP.

Example 22 includes the at least one machine readable storage medium in example 18 or 19 further comprising instructions, that when executed by one or more processors at the gNB, perform the following: decode a time density of an uplink (UL) PT-RS, received from the UE, for a BWP, based on an MCS of the BWP; and decode a frequency density of a UL PT-RS, received from the UE, for the BWP, based on an allocated bandwidth of the BWP.

Example 23 includes the at least one machine readable storage medium in example 18 or 19 further comprising instructions, that when executed by one or more processors at the gNB, perform the following: decode a time density of an uplink (UL) PT-RS, received from the UE, for each BWP in a plurality of BWPs, based on an MCS of each respective BWP; and decode a frequency density of a UL PT-RS, received from the UE, for each BWP in the plurality of BWPs based on an allocated bandwidth of each respective BWP.

Example 24 includes the at least one machine readable storage medium in example 18 or 19 further comprising instructions, that when executed by one or more processors at the gNB, perform the following: decode the PT-RS received from the UE in the BWP, with the PT-RS starting at a first data symbol that is not used by a demodulation reference symbol (DM-RS) in a physical uplink shared channel (PUSCH) allocation.

Example 25 includes an apparatus of a next generation node B (gNB), operable to use phase tracking reference signals (PT-RS), the apparatus comprising: one or more processors configured to: identify a modulation and coding scheme (MCS) for the UE for a bandwidth part (BWP) with a subcarrier spacing (SCS); select a time density of the PT-RS based on the MCS; select a frequency density of the PT-RS based on an allocated bandwidth in the BWP; and encode the time density and the frequency density, for the PT-RS for transmission to the UE in higher layer signaling; and a memory interface configured to send to a memory the time density based on the MCS, and frequency density based on the allocated bandwidth.

Example 26 includes the apparatus of a gNB of example 25, wherein the one or more processors are further configured to: encode the PT-RS for transmission to the UE in the BWP, with the PT-RS starting at a first data symbol that is not used by a demodulation reference symbol (DM-RS) in a physical downlink shared channel (PDSCH) allocation; or to encode the PT-RS for transmission to the UE at a resource element that is not used by a physical downlink control channel (PDCCH), a channel state information reference signal (CSI-RS), or a synchronization signal (SS) block.

Example 27 includes the apparatus of a gNB of example 25, wherein the one or more processors are further configured to: determine an MCS and an SCS for the UE for each of a plurality of BWPs; select a time density of the PT-RS for each BWP in the plurality of BWPs, based on the MCS of the BWP; select a frequency density of the PT-RS for each BWP in the plurality of BWPs based on an allocated bandwidth of each respective BWP; decode a time density of an uplink (UL) PT-RS, received from the UE, for each BWP in a plurality of BWPs, based on an MCS of each respective BWP; and decode a frequency density of a UL PT-RS, received from the UE, for each BWP in the plurality of BWPs based on the allocated bandwidth of each respective BWP.

Example 28 includes the apparatus of a gNB of example 25, wherein the one or more processors are further configured to: decode a time density of an uplink (UL) PT-RS, received from the UE, for a BWP, based on an MCS of the BWP; and decode a frequency density of a UL PT-RS, received from the UE, for the BWP, based on the allocated bandwidth of the BWP.

Example 29 includes the apparatus of a gNB of example 25, wherein the one or more processors are further configured to: decode the PT-RS received from the UE in the BWP, with the PT-RS starting at a first data symbol that is not used by a demodulation reference symbol (DM-RS) in a physical uplink shared channel (PUSCH) allocation; determine a dynamic presence of the PT-RS based on the MCS, the allocated bandwidth in the BWP and the presence of a signal with a time domain orthogonal cover code (TD-OCC); or encode the PT-RS for transmission to the UE in the BWP when the TD-OCC is not transmitted.

Example 30 includes an apparatus of a user equipment (UE), operable to use phase tracking reference signals (PT-RS), the apparatus comprising: one or more processors configured to: decode a modulation and coding scheme (MCS) received from a next generation node B (gNB) for a bandwidth part (BWP) with a subcarrier spacing (SCS); decode, a higher layer signal that includes a time density of the PT-RS based on the MCS for the BWP; decode, the higher layer signal that includes a frequency density of the PT-RS based on an allocated bandwidth in the BWP; and demodulate symbols received in a physical downlink shared channel (PDSCH) that are associated with the PT-RS, using the PT-RS; and a memory interface configured to send to a memory the time density based on the MCS and the frequency density based on allocated bandwidth.

Example 31 includes the apparatus of a UE of example 30, wherein the one or more processors are further configured to: decode the PT-RS received from the gNB in the BWP, with the PT-RS starting at a first data symbol after a demodulation reference symbol (DM-RS) in a physical downlink shared channel (PDSCH) allocation; or decode the symbols in the PDSCH, wherein the PT-RS received from the gNB in the PDSCH is not included in a resource element that is used for a physical downlink control channel (PDCCH), a channel state information reference signal (CSI-RS), or a synchronization signal (SS) block.

Example 32 includes the apparatus of a UE of example 30, wherein the one or more processors are further configured to: decode an MCS and an SCS for the UE for each of a plurality of BWPs; decode a time density of the PT-RS for each BWP in the plurality of BWPs, based on the MCS of the BWP; decode a frequency density of the PT-RS for each BWP in the plurality of BWPs based on an allocated bandwidth of each respective BWP; encode a time density of an uplink (UL) PT-RS, for transmission to the gNB, for each BWP in the plurality of BWPs, based on an MCS of each respective BWP; and encode a frequency density of a UL PT-RS, for transmission to the gNB, for each BWP in the plurality of BWPs based on the allocated bandwidth of each respective BWP.

Example 33 includes the apparatus of a UE of example 30, wherein the one or more processors are further configured to: encode a time density of an uplink (UL) PT-RS, for transmission to the gNB, for a BWP, based on an MCS of the BWP; and encode a frequency density of a UL PT-RS, for transmission to the gNB, for the BWP, based on the allocated bandwidth of the BWP.

Example 34 includes the apparatus of a UE of example 30, wherein the one or more processors are further configured to encode the PT-RS, for transmission to the gNB, with the PT-RS starting at a first data symbol that is not used by a demodulation reference symbol (DM-RS) in a physical uplink shared channel (PUSCH).

Example 35 includes the apparatus of example 30, wherein the UE includes an antenna, a touch sensitive display screen, a speaker, a microphone, a graphics processor, an application processor, an internal memory, a non-volatile memory port, or combinations thereof.

Example 36 includes the at least one machine readable storage medium having instructions embodied thereon for a next generation node B (gNB), operable to use phase tracking reference signals (PT-RS), the instructions thereon when executed by one or more processors at the UE perform the following: select a time density of the PT-RS based on a modulation and coding scheme (MCS); select a frequency density of the PT-RS based on an allocated bandwidth of the BWP; and encode the time density and the frequency density, for the PT-RS for transmission to the UE in higher layer signaling.

Example 37 includes the at least one machine readable storage medium in example 36 further comprising instructions, that when executed by one or more processors at the gNB, perform the following: encode the PT-RS for transmission to the UE in the BWP, with the PT-RS starting at a first data symbol that is not used by a demodulation reference symbol (DM-RS) in a physical downlink shared channel (PDSCH) allocation; or encode the PT-RS for transmission to the UE at a resource element that is not used by a physical downlink control channel (PDCCH), a channel state information reference signal (CSI-RS), or a synchronization signal (SS) block.

Example 38 includes the at least one machine readable storage medium in example 36 further comprising instructions, that when executed by one or more processors at the gNB, perform the following: determine an MCS and an SCS for the UE for each of a plurality of BWPs; select a time density of the PT-RS for each BWP in the plurality of BWPs, based on the MCS of the BWP; and select a frequency density of the PT-RS for each BWP in the plurality of BWPs based on an allocated bandwidth of each respective BWP; decode a time density of an uplink (UL) PT-RS, received from the UE, for each BWP in the plurality of BWPs, based on an MCS of each respective BWP; and decode a frequency density of a UL PT-RS, received from the UE, for each BWP in the plurality of BWPs based on an allocated bandwidth of each respective BWP.

Example 39 includes the at least one machine readable storage medium in example 36 further comprising instructions, that when executed by one or more processors at the gNB, perform the following: decode a time density of an uplink (UL) PT-RS, received from the UE, for a BWP, based on an MCS of the BWP; and decode a frequency density of a UL PT-RS, received from the UE, for the BWP, based on an allocated bandwidth of the BWP; decode the PT-RS received from the UE in the BWP, with the PT-RS starting at a first data symbol that is not used by a demodulation reference symbol (DM-RS) in a physical uplink shared channel (PUSCH) allocation.

Example 40 includes the means for using phase tracking reference signals (PT-RS) at a next generation node B (gNB), the means comprising: a means for selecting a time density of the PT-RS based on a modulation and coding scheme (MCS); a means for selecting a frequency density of the PT-RS based on an allocated bandwidth of the BWP; and a means for encoding the time density and the frequency density, for the PT-RS for transmission to the UE in higher layer signaling.

Example 41 includes the means for using phase tracking reference signals (PT-RS) at a next generation node B (gNB) of example 40, further comprising: a means for encoding the PT-RS for transmission to the UE in the BWP, with the PT-RS starting at a first data symbol that is not used by a demodulation reference symbol (DM-RS) in a physical downlink shared channel (PDSCH) allocation.

Example 42 includes the means for using phase tracking reference signals (PT-RS) at a next generation node B (gNB) of example 40, further comprising: a means for encoding the PT-RS for transmission to the UE at a resource element that is not used by a physical downlink control channel (PDCCH), a channel state information reference signal (CSI-RS), or a synchronization signal (SS) block.

Example 43 includes the means for using phase tracking reference signals (PT-RS) at a next generation node B (gNB) of example 40, further comprising: a means for determining an MCS and an SCS for the UE for each of a plurality of BWPs; a means for selecting a time density of the PT-RS for each BWP in the plurality of BWPs, based on the MCS of the BWP; and a means for selecting a frequency density of the PT-RS for each BWP in the plurality of BWPs based on an allocated bandwidth of each respective BWP.

Example 44 includes the means for using phase tracking reference signals (PT-RS) at a next generation node B (gNB) of example 40, further comprising: a means for decoding a time density of an uplink (UL) PT-RS, received from the UE, for a BWP, based on an MCS of the BWP; and a means for decoding a frequency density of a UL PT-RS, received from the UE, for the BWP, based on an allocated bandwidth of the BWP.

Example 45 includes the means for using phase tracking reference signals (PT-RS) at a next generation node B (gNB) of example 40, further comprising: a means for decoding a time density of an uplink (UL) PT-RS, received from the UE, for each BWP in a plurality of BWPs, based on an MCS of each respective BWP; and a means for decoding a frequency density of a UL PT-RS, received from the UE, for each BWP in the plurality of BWPs based on an allocated bandwidth of each respective BWP.

Example 46 includes the means for using phase tracking reference signals (PT-RS) at a next generation node B (gNB) of example 40, further comprising: a means for decoding the PT-RS received from the UE in the BWP, with the PT-RS starting at a first data symbol that is not used by a demodulation reference symbol (DM-RS) in a physical uplink shared channel (PUSCH) allocation.

Various techniques, or certain aspects or portions thereof, may take the form of program code (i.e., instructions)

embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a base station, operable to use phase tracking reference signals (PT-RSs), the apparatus comprising:
one or more processors configured to:
identify a plurality of modulation and coding schemes (MCSs) for a UE for each of a plurality of bandwidth parts (BWPs) each having a subcarrier spacing (SCS);
select a time density of a PT-RS for each of the plurality of BWPs based on the MCS of each respective BWP;

select a frequency density of the PT-RS for each of the plurality of BWPs based on an allocated bandwidth for each respective BWP; and encode the time density and the frequency density for the PT-RS for each of the plurality of BWPs for transmission to the UE in higher layer signaling; and a memory interface configured to send to a memory the time density for each of the plurality of BWPs based on the MCS of each respective BWP, and frequency density for each of the plurality of BWPs based on the allocated bandwidth for each respective BWP.

2. The apparatus of claim 1, wherein the one or more processors are further configured to encode the PT-RS for each of the plurality of BWPs for transmission to the UE in the BWP associated with the respective PT-RS, with at least one of the PT-RSs starting at a first data symbol that is not used by a demodulation reference symbol (DM-RS) in a physical downlink shared channel (PDSCH) allocation.

3. The apparatus of claim 1, wherein the one or more processors are further configured to encode the PT-RS for each of the plurality of BWPs for transmission to the UE at a resource element in each respective BWP that is not used by a physical downlink control channel (PDCCH), a channel state information reference signal (CSI-RS), or a synchronization signal (SS) block.

4. The apparatus of claim 1, wherein the one or more processors are further configured to:
decode a time density of an uplink (UL) PT-RS received from the UE for a BWP based on an MCS of the BWP; and
decode a frequency density of the UL PT-RS received from the UE for the BWP based on the allocated bandwidth of the BWP.

5. The apparatus of claim 1, wherein the one or more processors are further configured to:
decode a time density of an uplink (UL) PT-RS received from the UE, for each of the plurality of BWPs based on an MCS of each respective BWP; and
decode a frequency density of the UL PT-RS received from the UE for each of the plurality of BWPs based on the allocated bandwidth of each respective BWP.

6. The apparatus of claim 1, wherein the one or more processors are further configured to decode a PT-RS received from the UE in a BWP of the plurality of BWPs, with the PT-RS received from the UE starting at a first data symbol that is not used by a demodulation reference symbol (DM-RS) in a physical uplink shared channel (PUSCH) allocation.

7. At least one non-transitory machine readable storage medium having instructions embodied thereon for a base station, operable to use phase tracking reference signals (PT-RSs), the instructions thereon when executed by one or more processors at the base station perform the following:
select a time density of a PT-RS for each of a plurality of bandwidth parts (BWPs) based on a modulation and coding scheme (MCS) of each respective BWP;

select a frequency density of the PT-RS for each of the plurality of BWPs based on an allocated bandwidth for each respective BWP; and encode the time density and the frequency density for the PT-RS for each of the plurality of BWPs for transmission to the UE in higher layer signaling.

8. The at least one non-transitory machine readable storage medium in claim 7 further comprising instructions, that when executed by the one or more processors at the base station, perform the following:
encode the PT-RS for each of the plurality of BWPs for transmission to the UE in the BWP associated with the respective PT-RS, with at least one of the PT-RSs starting at a first data symbol that is not used by a demodulation reference symbol (DM-RS) in a physical downlink shared channel (PDSCH) allocation.

9. The at least one non-transitory machine readable storage medium in claim 7 further comprising instructions, that when executed by the one or more processors at the base station, perform the following:
encode the PT-RS for each of the plurality of BWPs for transmission to the UE at a resource element in each respective BWP that is not used by a physical downlink control channel (PDCCH), a channel state information reference signal (CSI-RS), or a synchronization signal (SS) block.

10. The at least one non-transitory machine readable storage medium in claim 7 further comprising instructions, that when executed by the one or more processors at the base station, perform the following:
decode a time density of an uplink (UL) PT-RS received from the UE for a BWP based on an MCS of the BWP; and
decode a frequency density of the UL PT-RS received from the UE for the BWP based on an allocated bandwidth of the BWP.

11. The at least one non-transitory machine readable storage medium in claim 7 further comprising instructions, that when executed by the one or more processors at the base station, perform the following:
decode a time density of an uplink (UL) PT-RS, received from the UE, for each of the plurality of BWPs based on an MCS of each respective BWP; and
decode a frequency density of the UL PT-RS received from the UE for each of the plurality of BWPs based on an allocated bandwidth of each respective BWP.

12. The at least one non-transitory machine readable storage medium in claim 7 further comprising instructions, that when executed by the one or more processors at the base station, perform the following:
decode a PT-RS received from the UE in a BWP of the plurality of BWPs, with the PT-RS received from the UE starting at a first data symbol that is not used by a demodulation reference symbol (DM-RS) in a physical uplink shared channel (PUSCH) allocation.

* * * * *